United States Patent [19]

Moed

[11] 4,133,980

[45] Jan. 9, 1979

[54] DATA PULSE REGISTER/SENDER FOR A TDM SWITCHING SYSTEM

[75] Inventor: Johannes A. R. Moed, San Jose, Calif.

[73] Assignee: TRW, Inc., Los Angeles, Calif.

[21] Appl. No.: 762,801

[22] Filed: Jan. 26, 1977

[51] Int. Cl.² .............................................. H04J 3/12
[52] U.S. Cl. ........................... 179/15 BY; 179/18 EB
[58] Field of Search .............. 179/15 BY, 18 EB, 18 J

[56] References Cited

U.S. PATENT DOCUMENTS

| | | | |
|---|---|---|---|
| 3,601,546 | 8/1971 | Lee .................................. | 179/18 EB |
| 3,760,116 | 9/1973 | O'Toole et al. ..................... | 179/18 J |
| 3,851,110 | 11/1974 | Kelly et al. ...................... | 179/18 EB |
| 3,941,936 | 3/1976 | Graham et al. ................. | 179/15 AT |

Primary Examiner—Thomas W. Brown
Attorney, Agent, or Firm—Flehr, Hohbach, Test, Albritton & Herbert

[57] ABSTRACT

A dial pulse register/sender for use in a telephone system operating in time frames each consisting of a plurality of time slots. The register/sender is capable of detecting and sending supervisory signals in dial pulse format for each time slot. The register/sender includes an integrator for filtering contact bounce, a timer for detecting a change of state in the supervisory signal, a pulse counter for counting the digits received, and sender for sending supervisory signals. Each time slot has one memory location and sequentially uses common logic of the register/sender.

21 Claims, 28 Drawing Figures

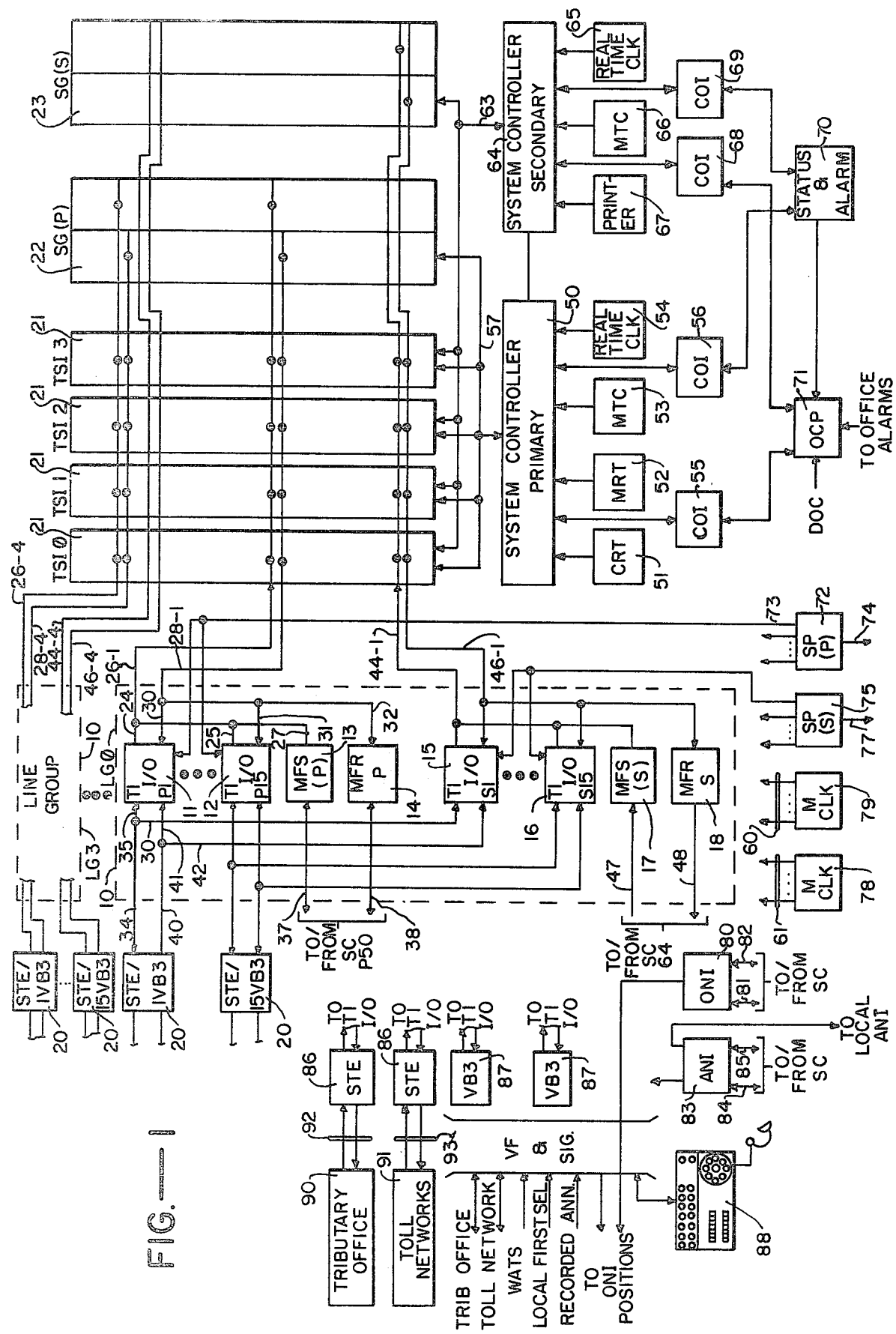
FIG.—1

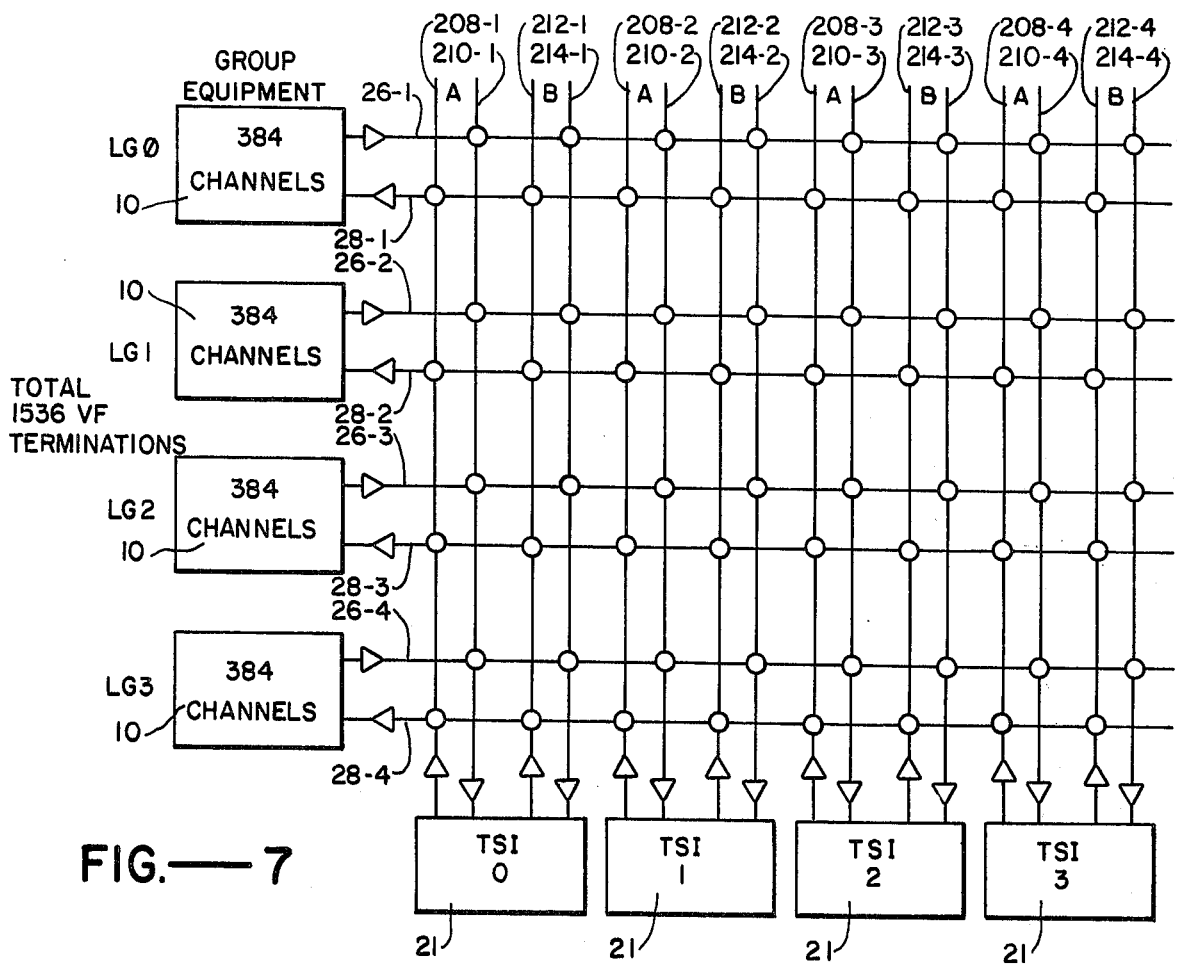
FIG.—7
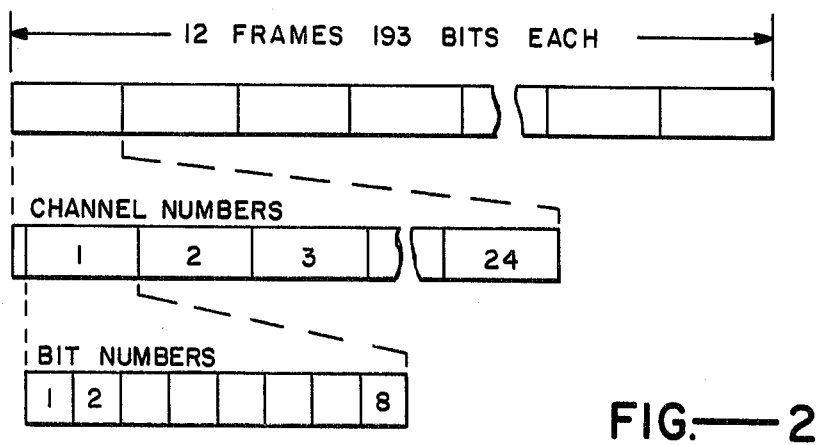
FIG.—2
| FRAME NUMBER | 1 | 2 | 3 | 4 | 5 | 6* | 7 | 8 | 9 | 10 | 11 | 12* |
|---|---|---|---|---|---|---|---|---|---|---|---|---|
| FRAME BIT | 1 | 0 | 0 | 0 | 1 | 1 | 0 | 1 | 1 | 1 | 0 | 0 |
FIG.—3

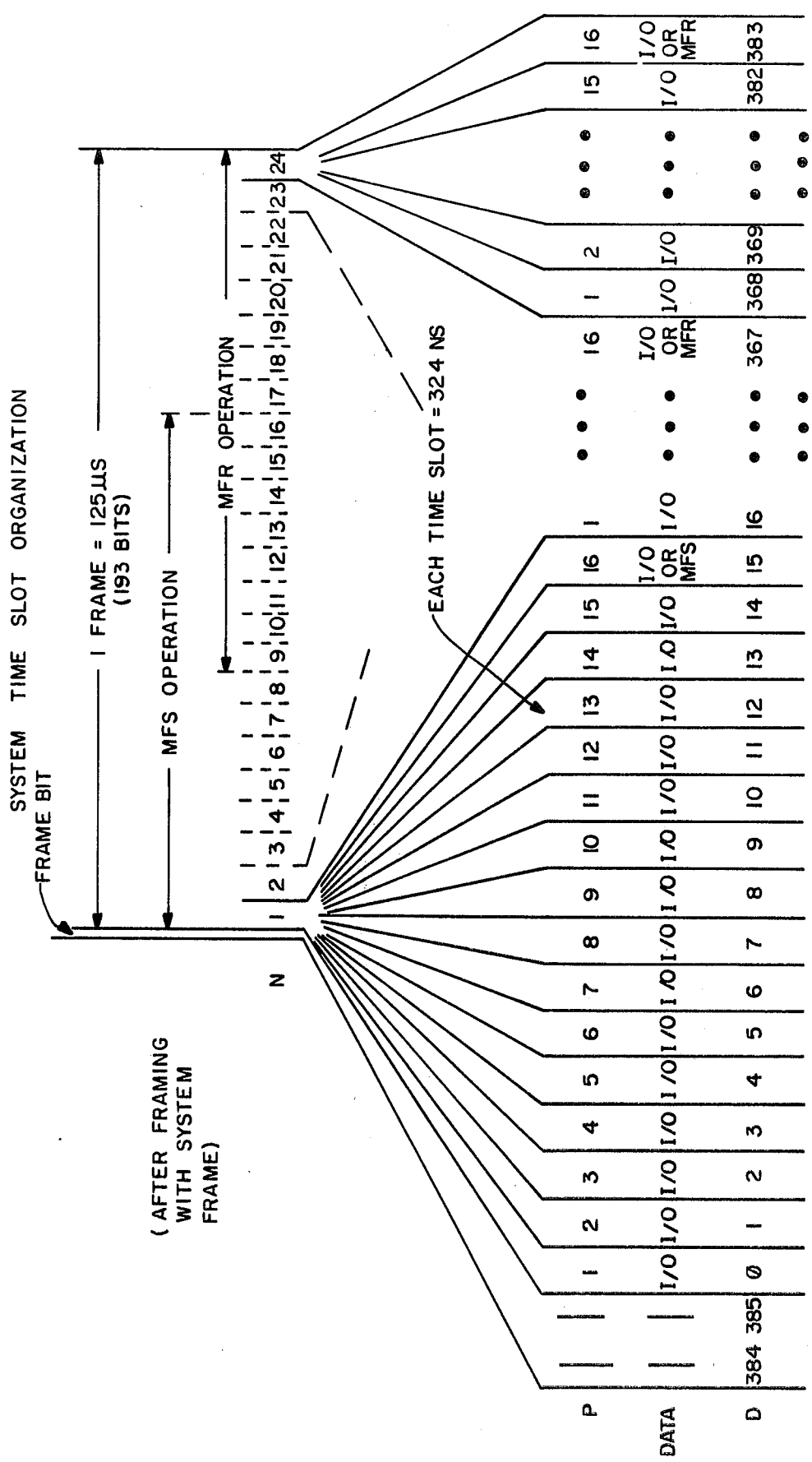
FIG.—4

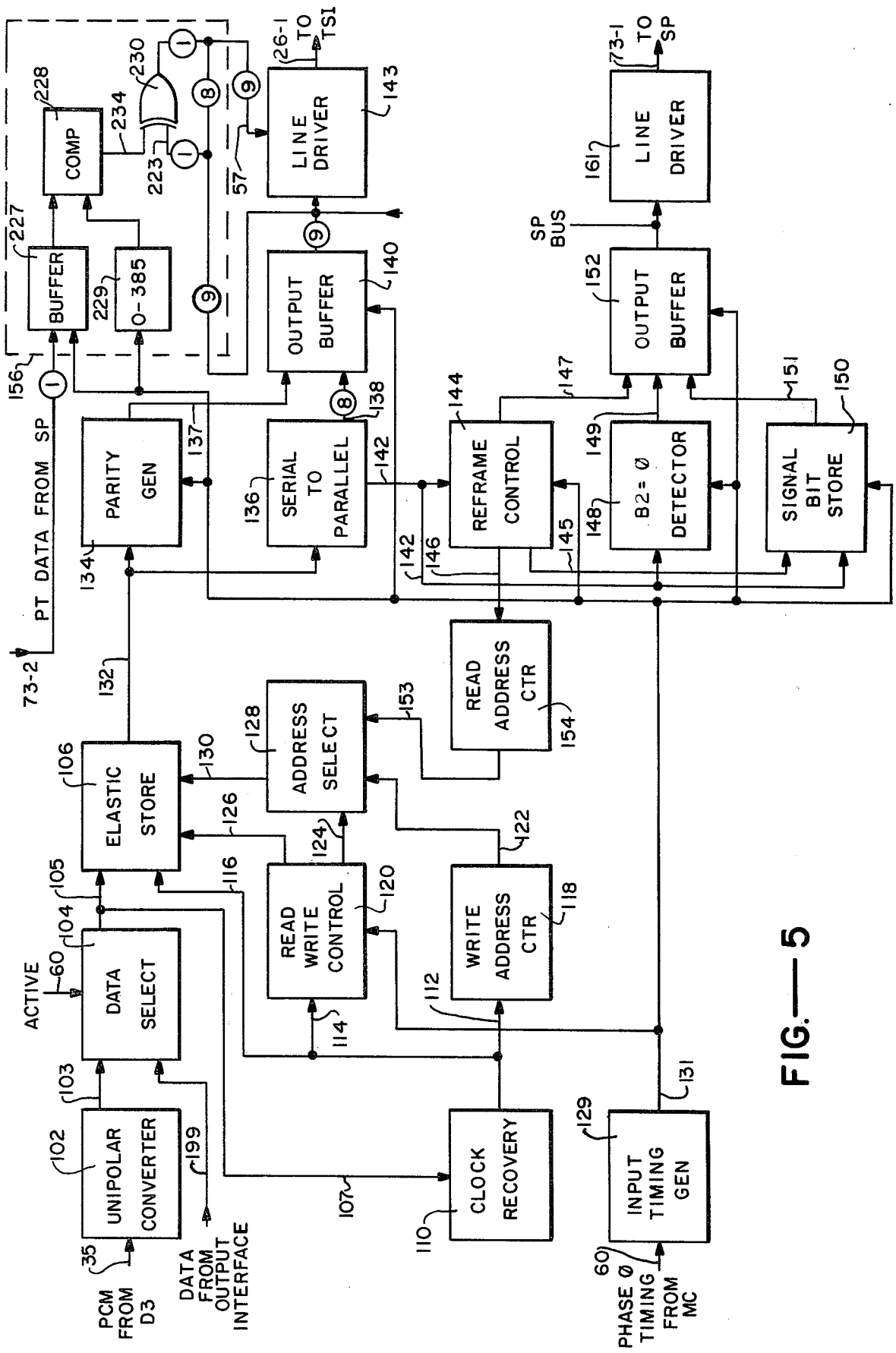
FIG.—5

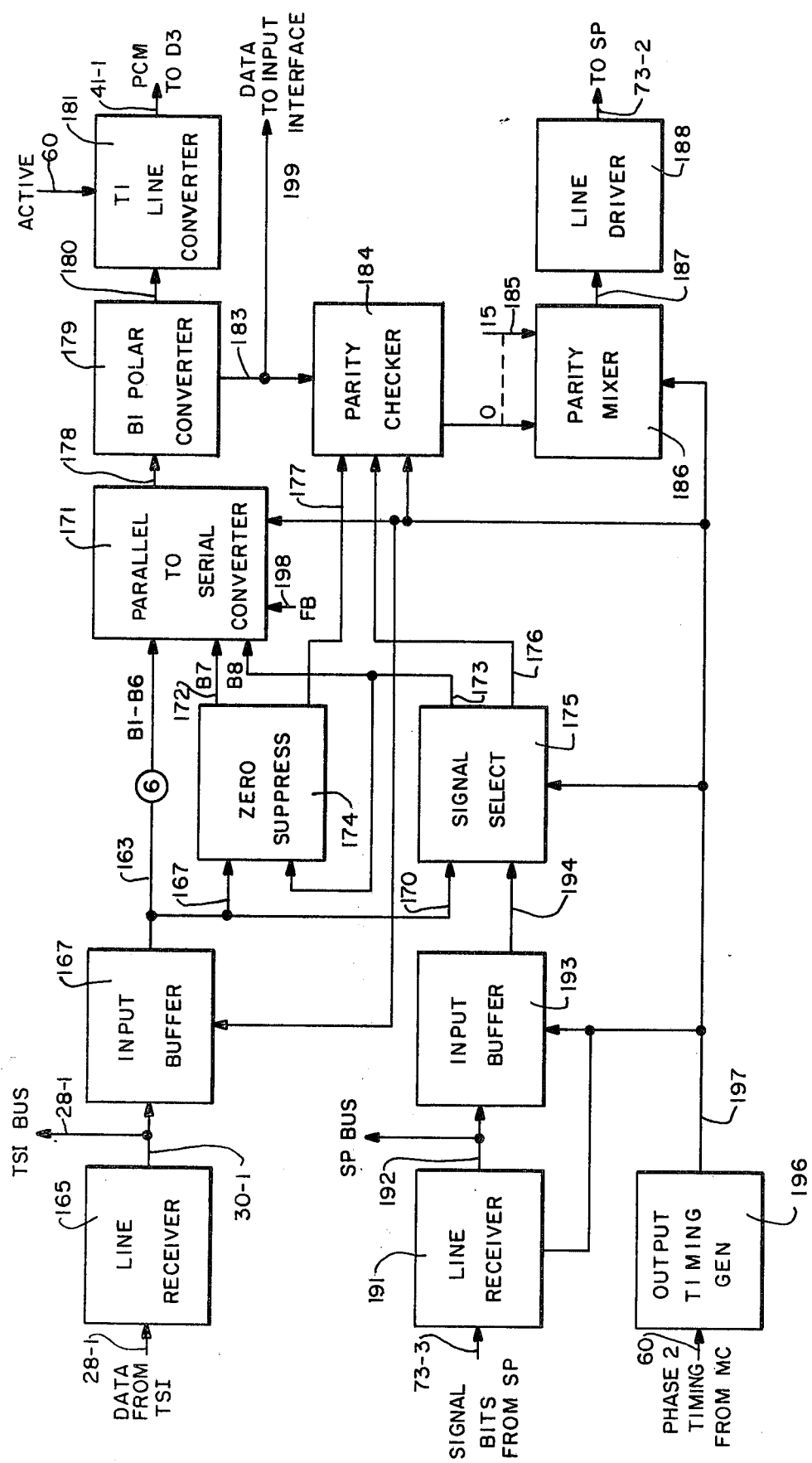
FIG.—6

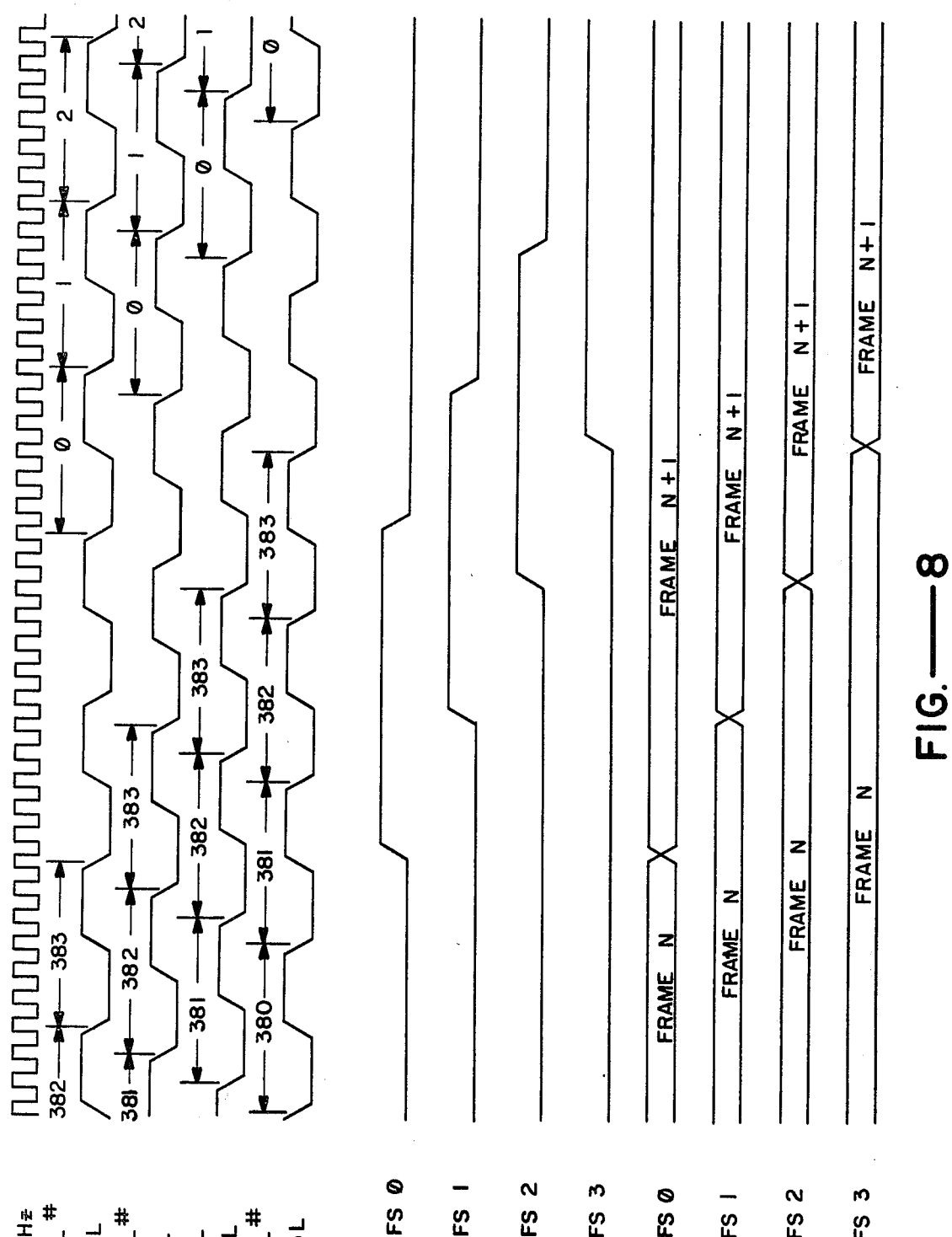
FIG.—8

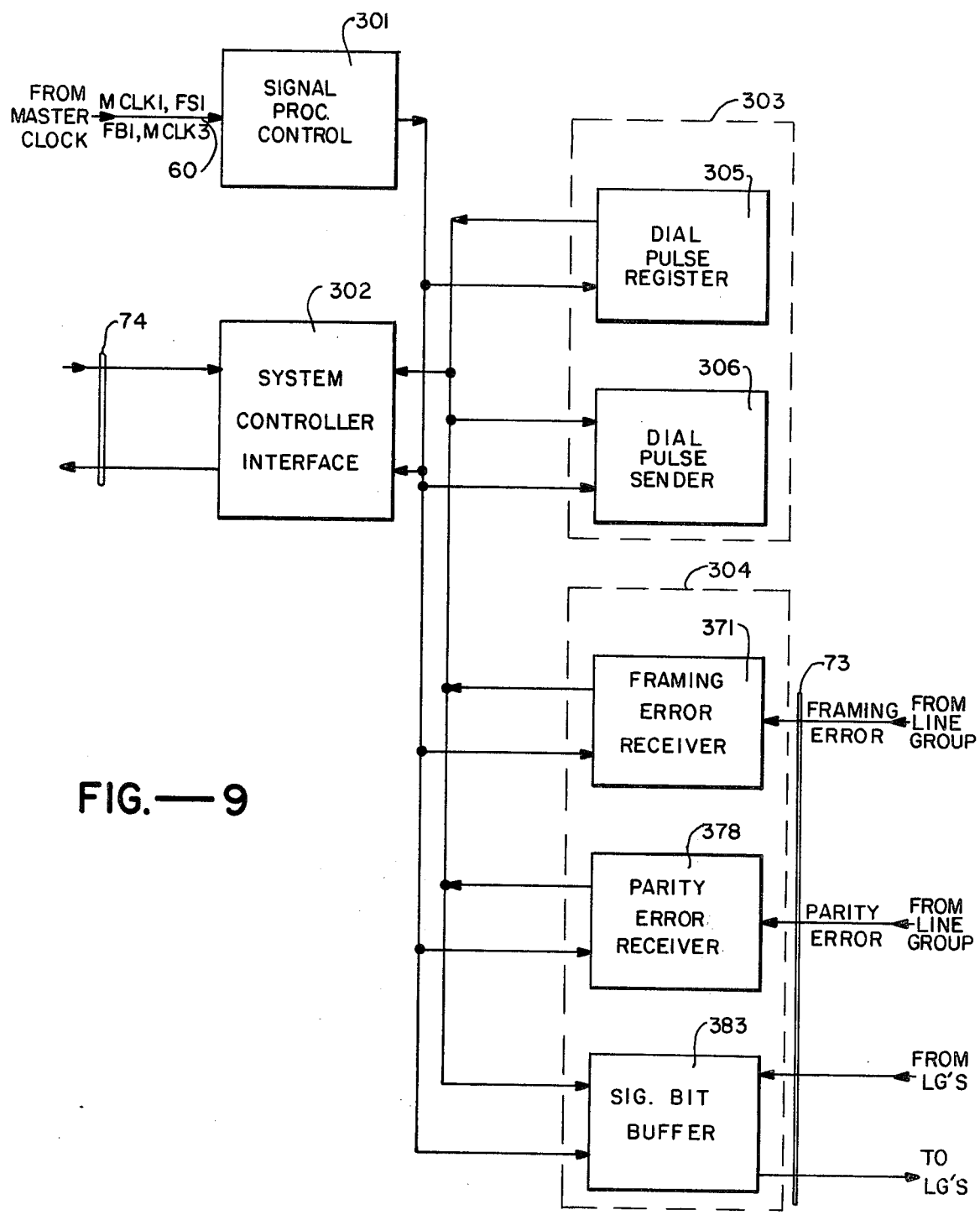
FIG.—9

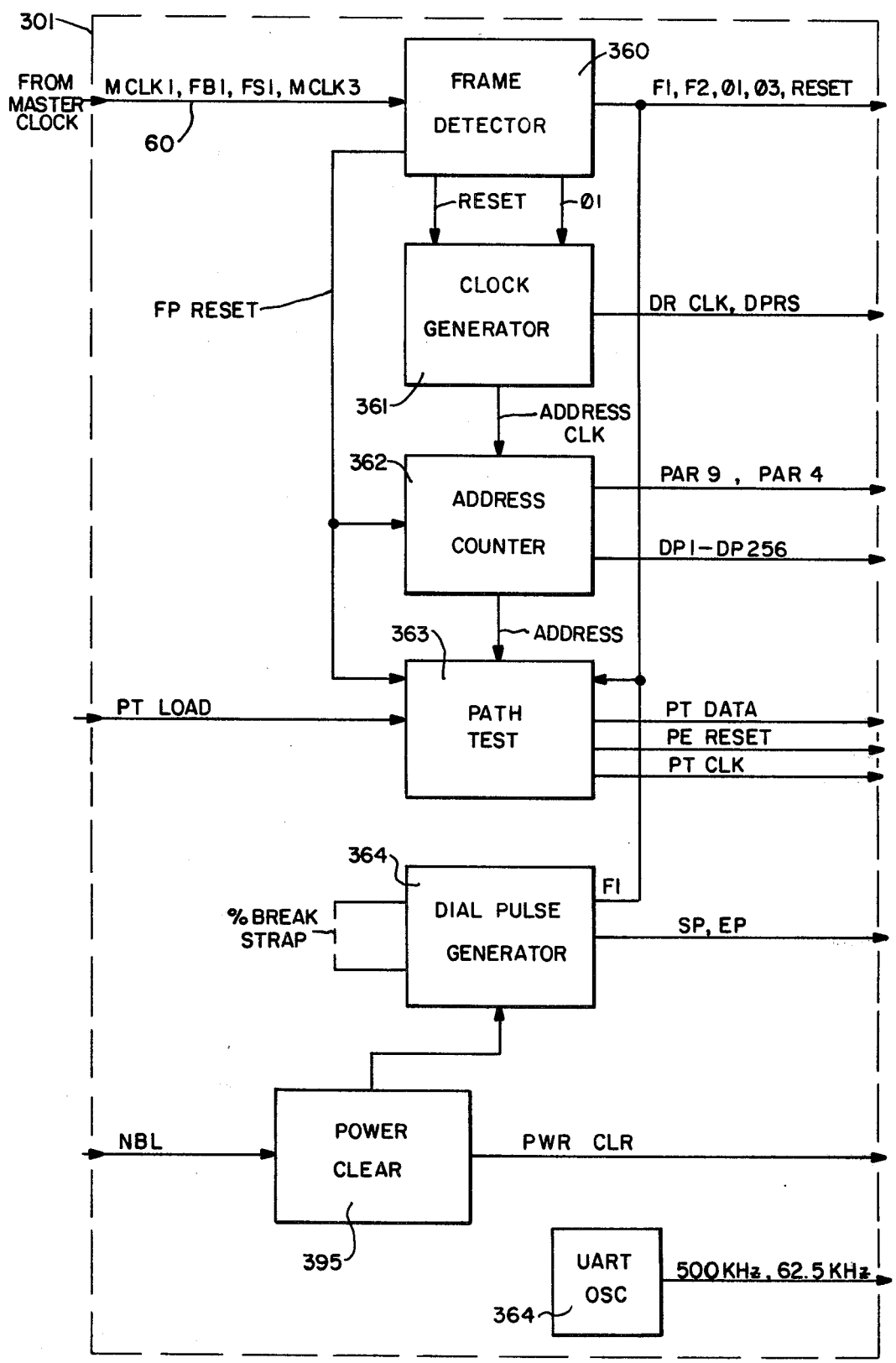
FIG.—10A

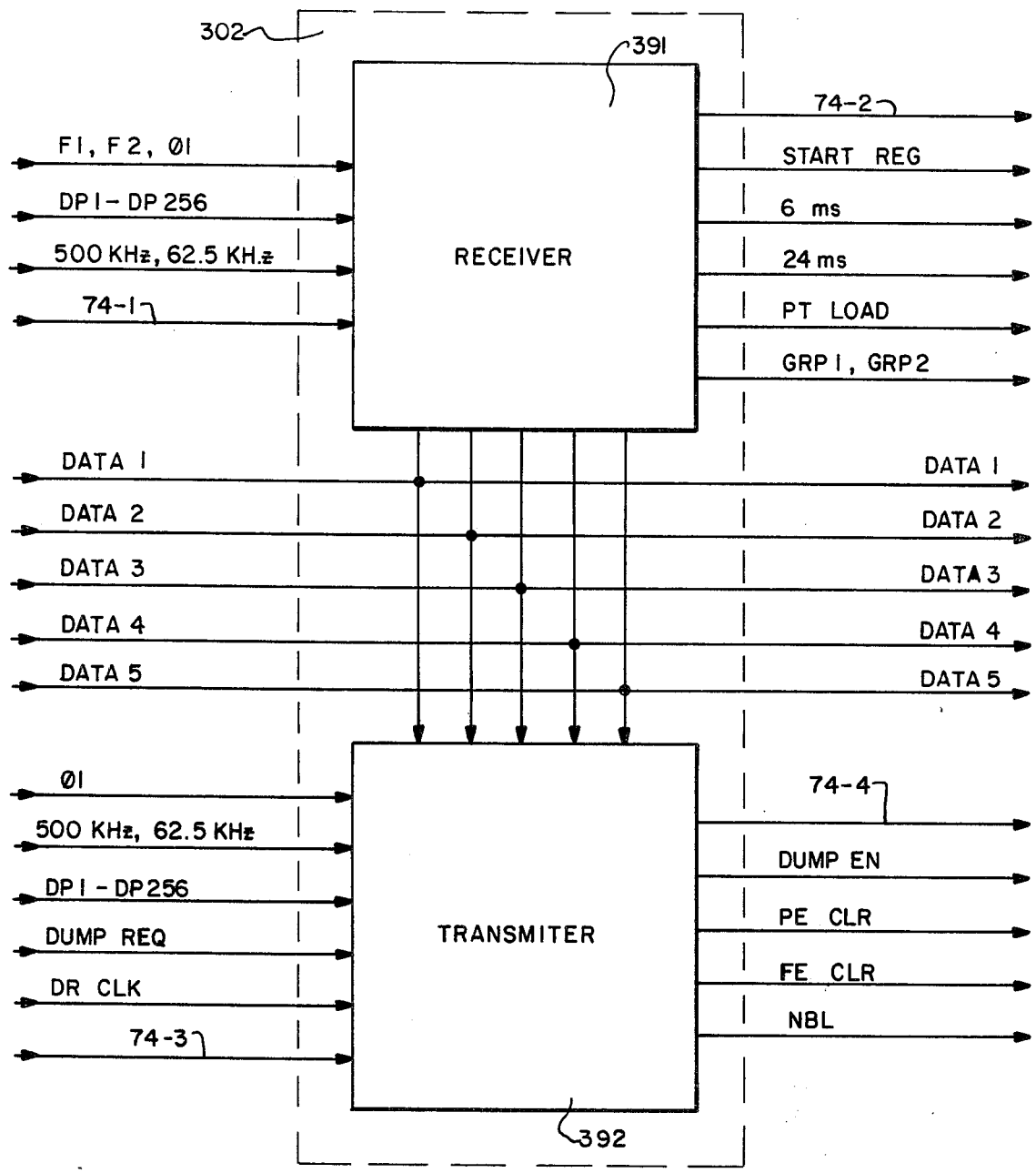
FIG.—10B

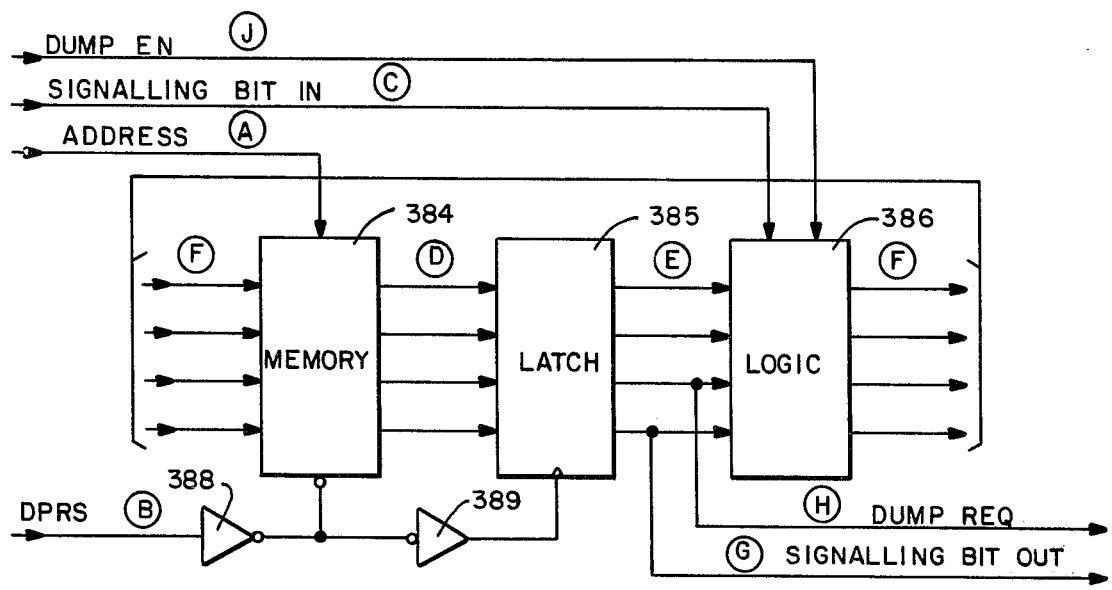
FIG.—11
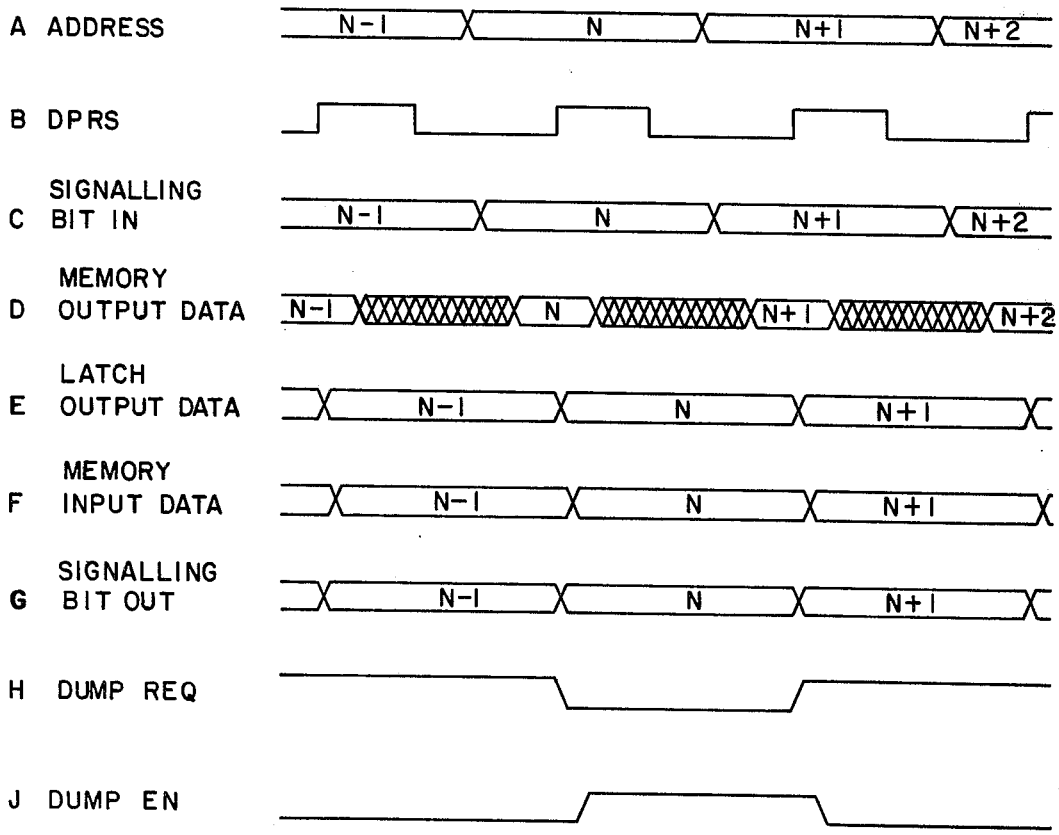
FIG.—12

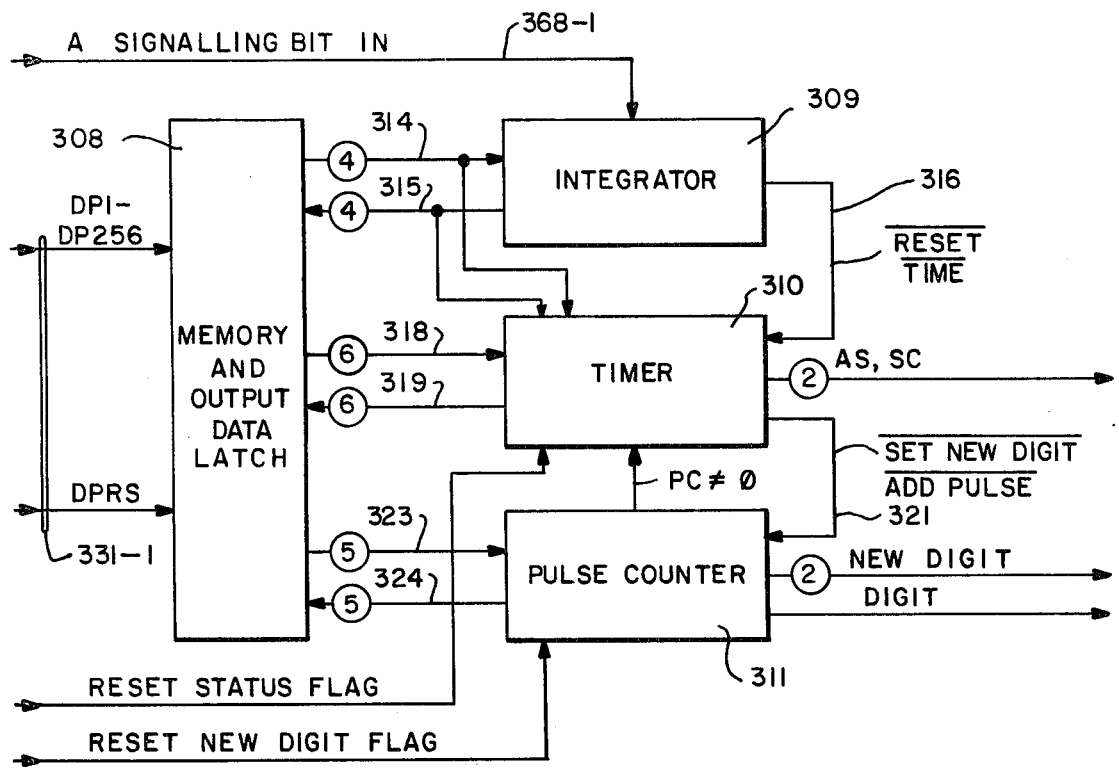
FIG.—13
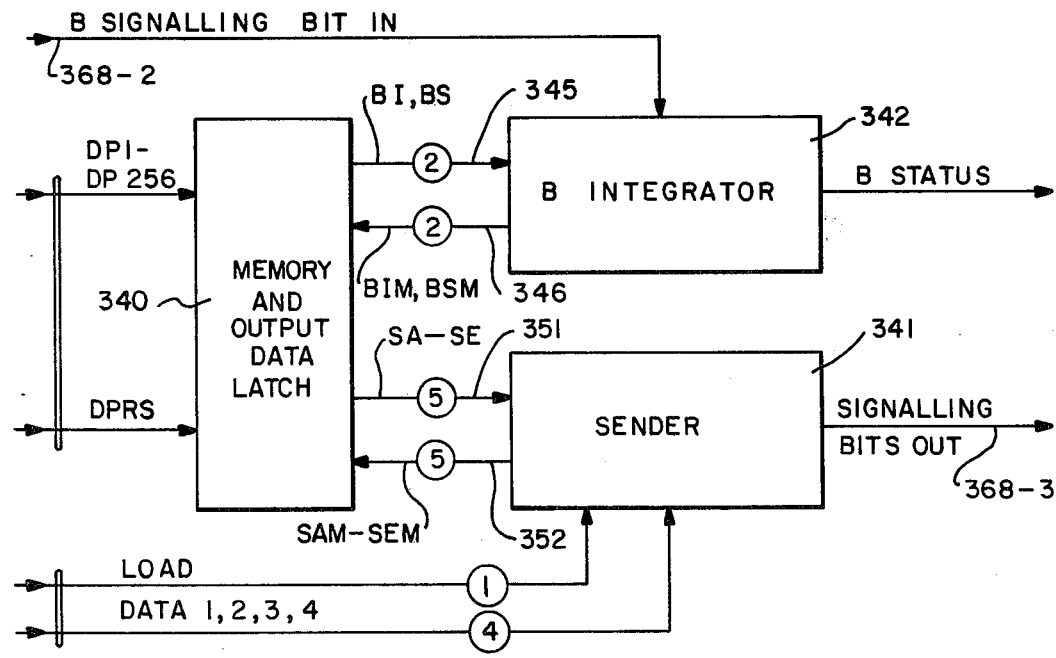
FIG.—14

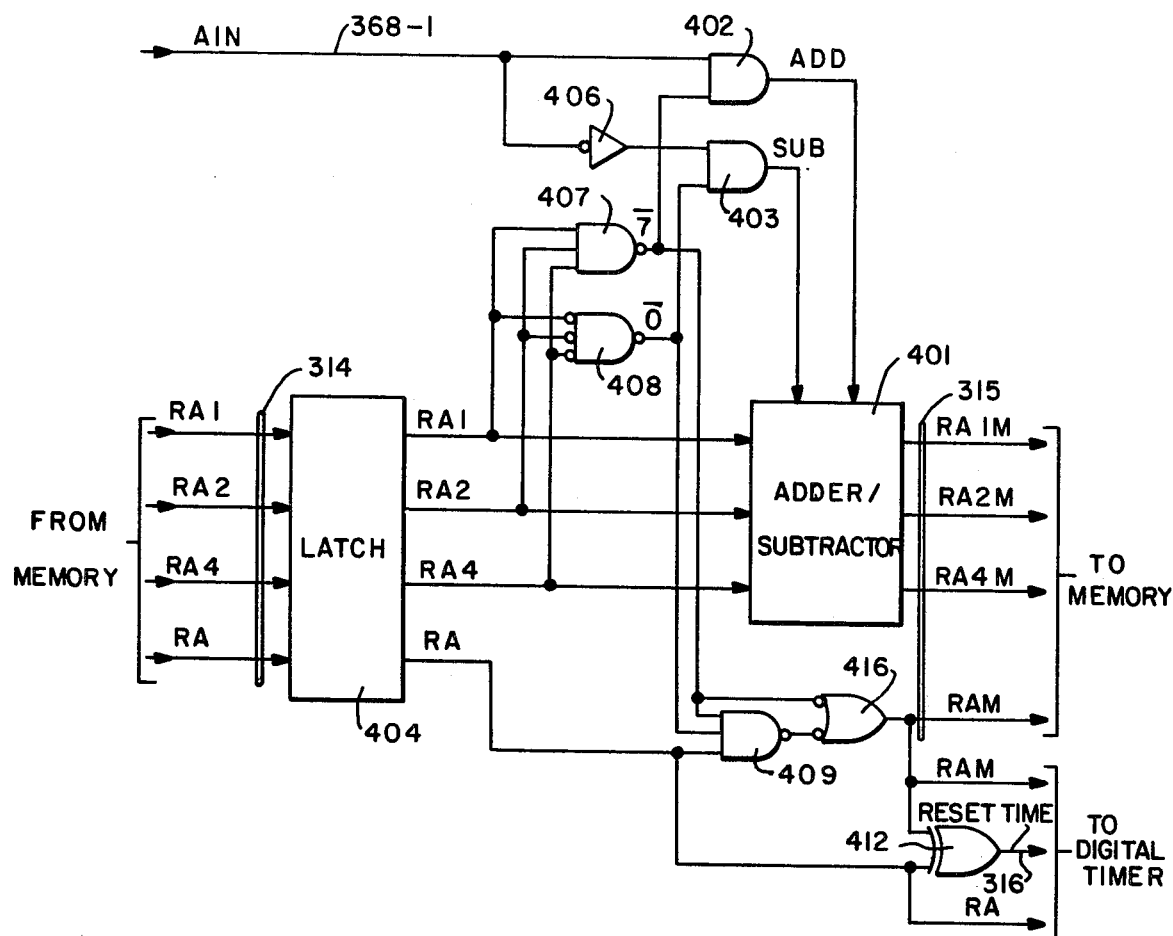
FIG.—15
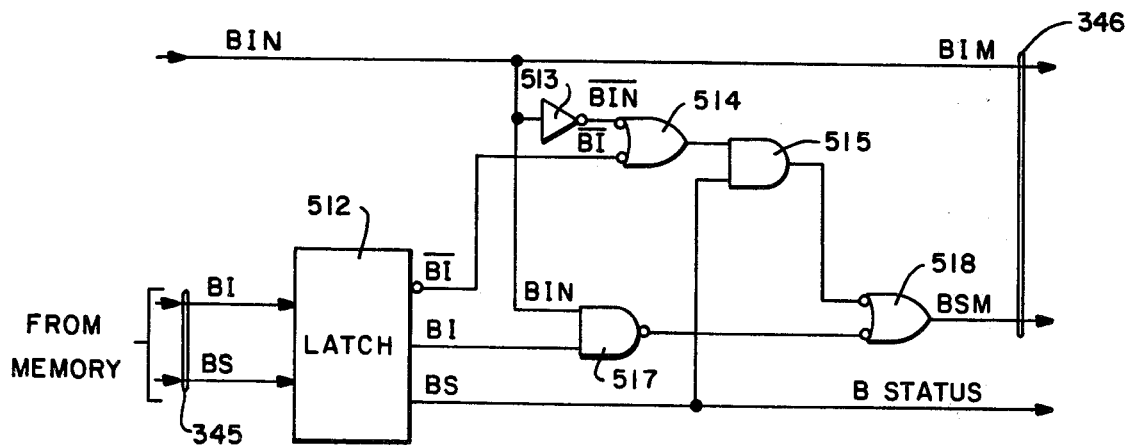
FIG.—16

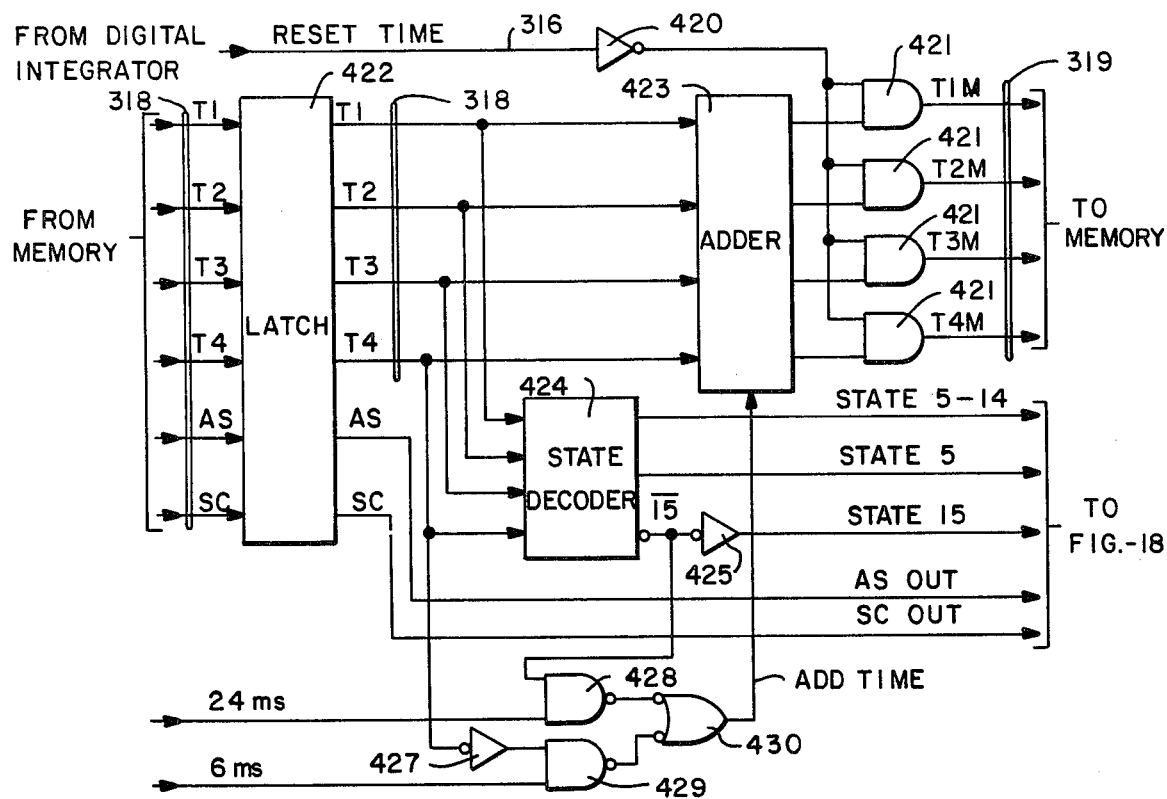
FIG.—17
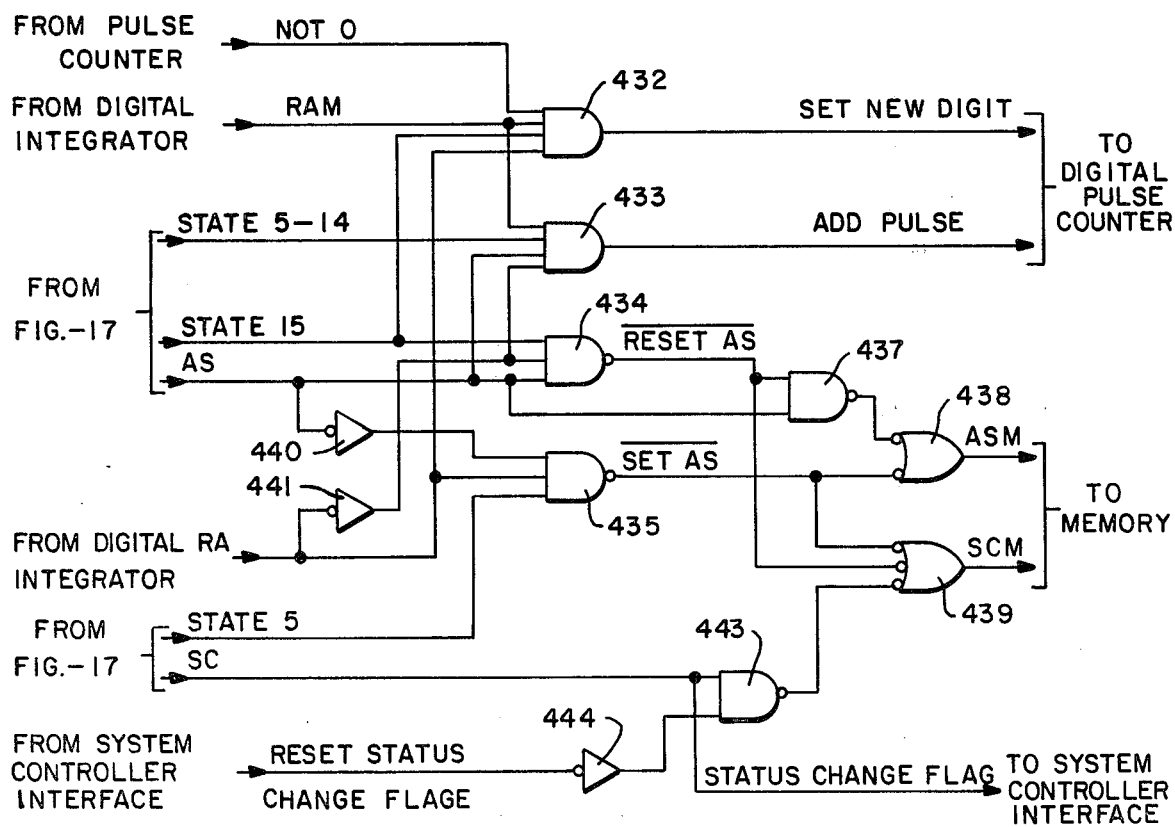
FIG.—18

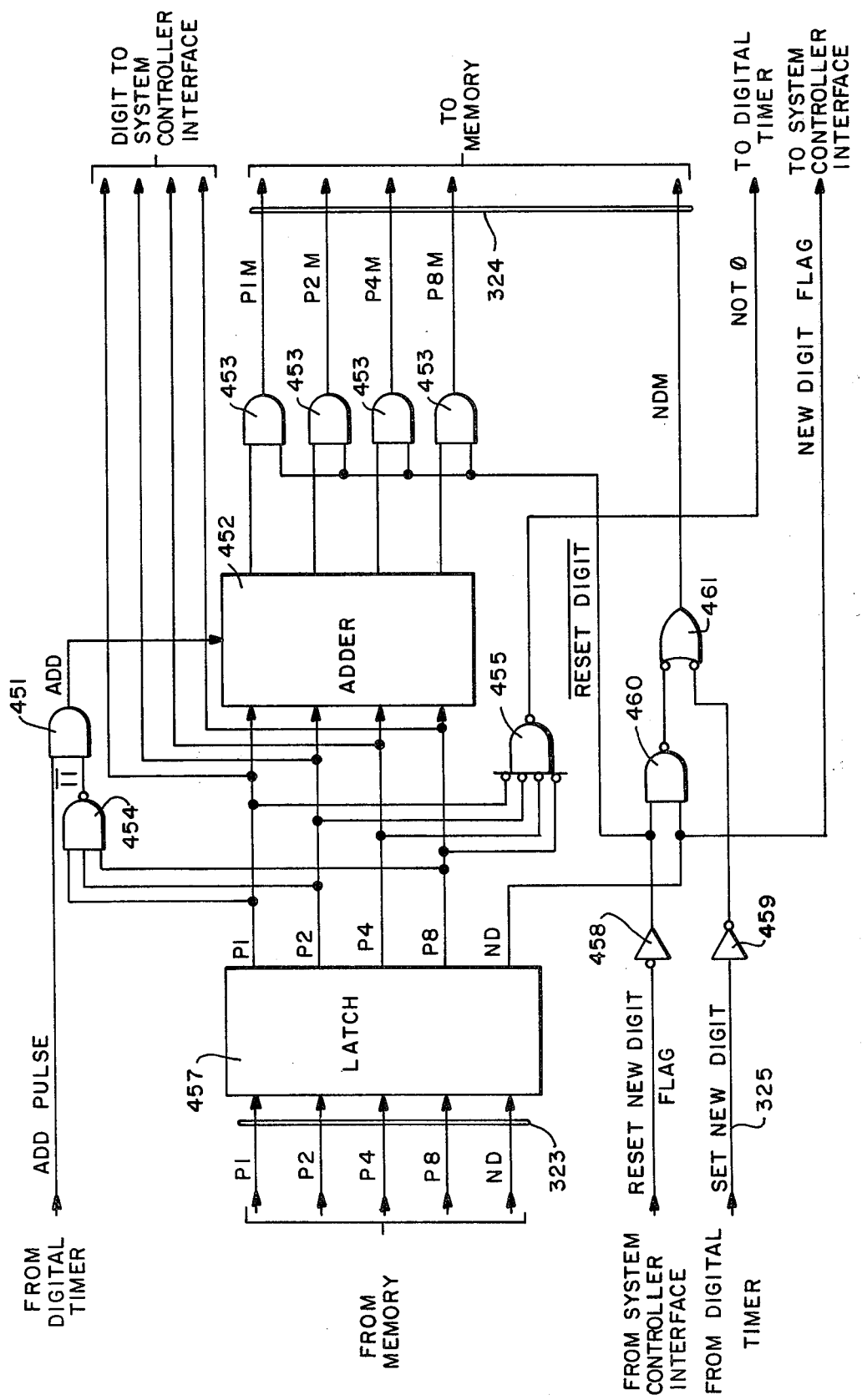
FIG.—19

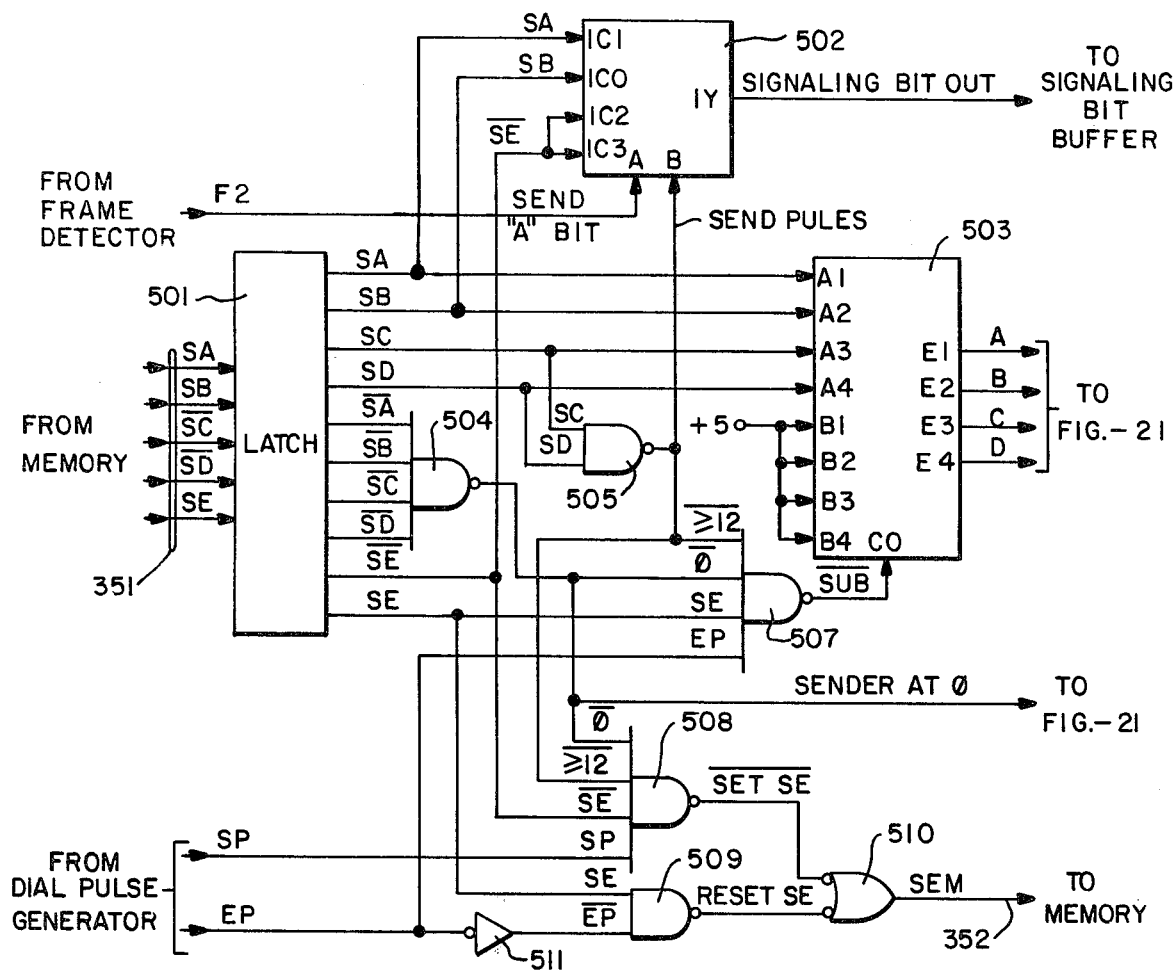
FIG.—20
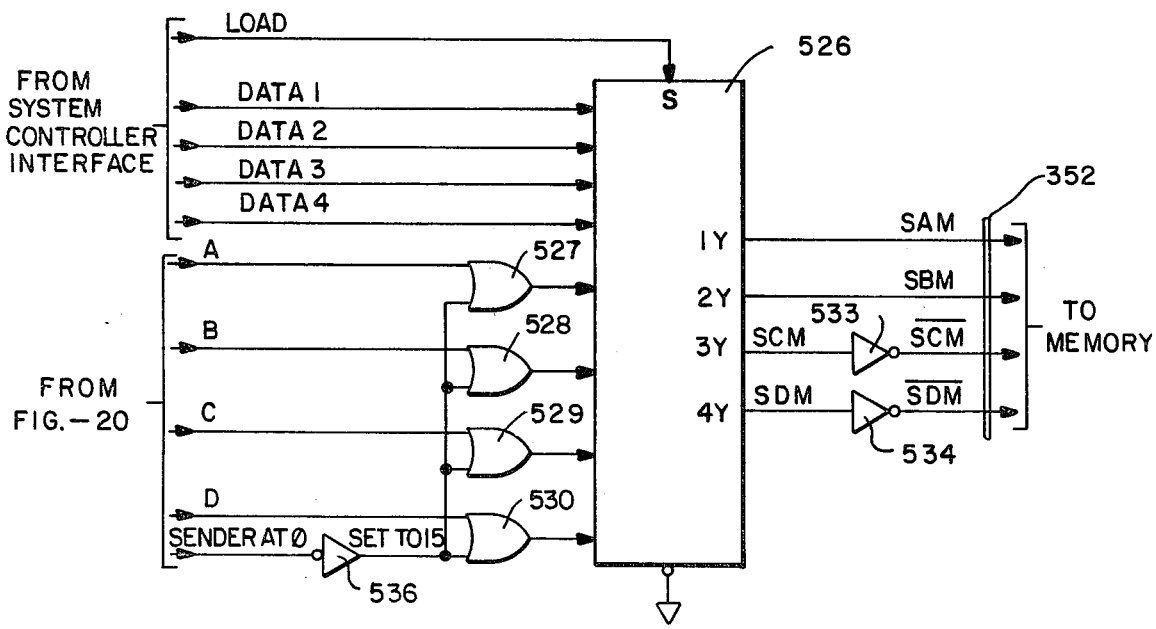
FIG.—21

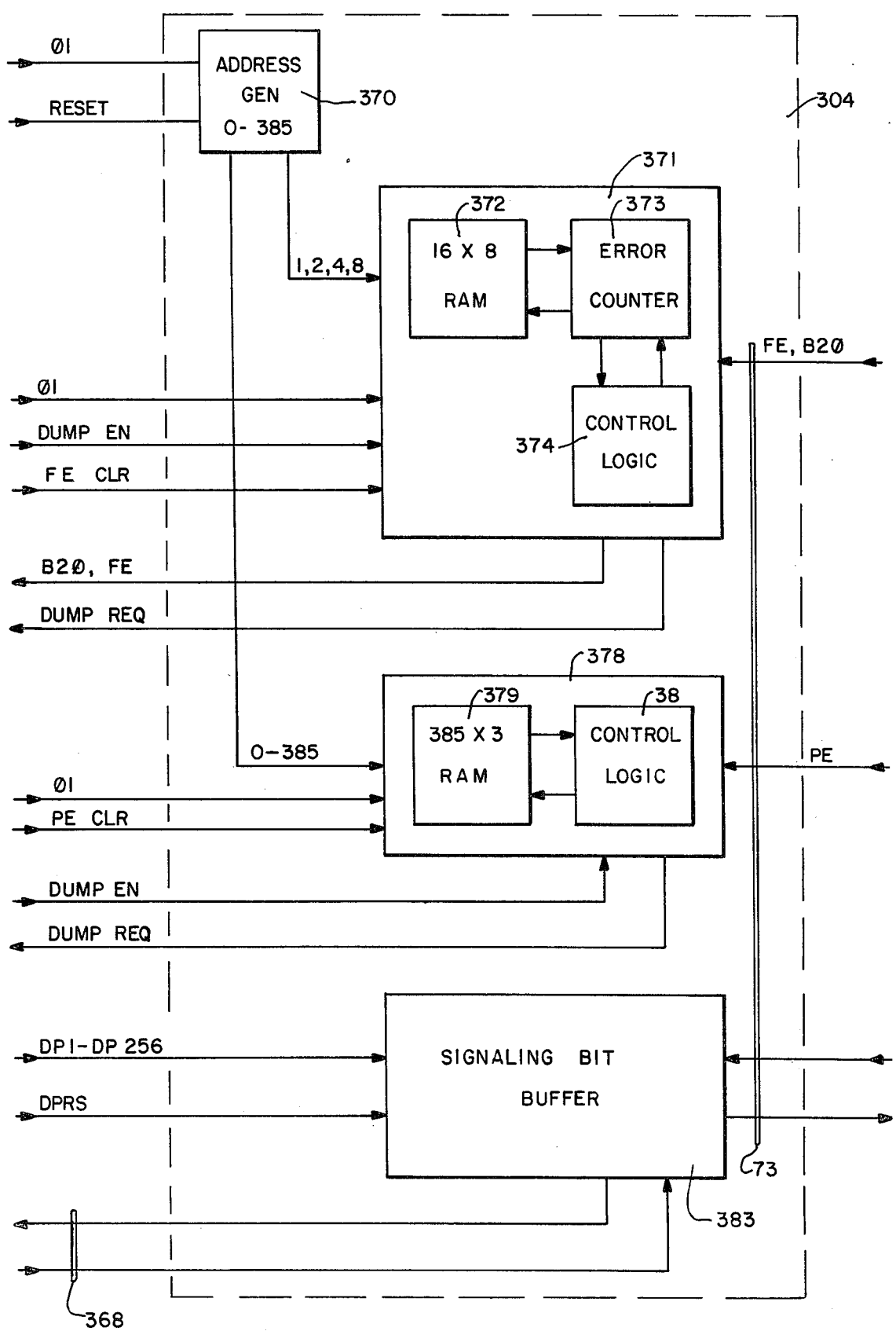
FIG.—22

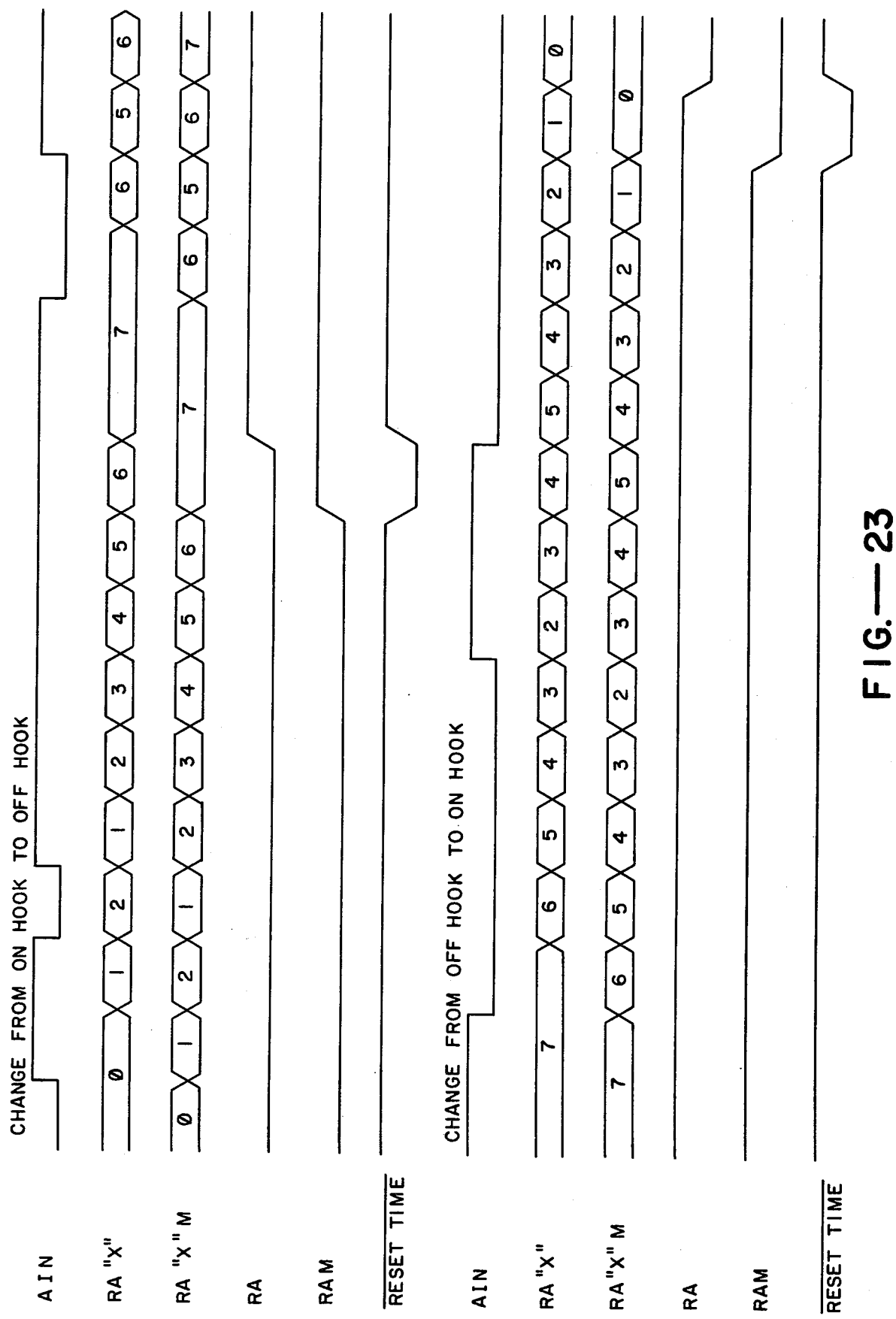
FIG.—23

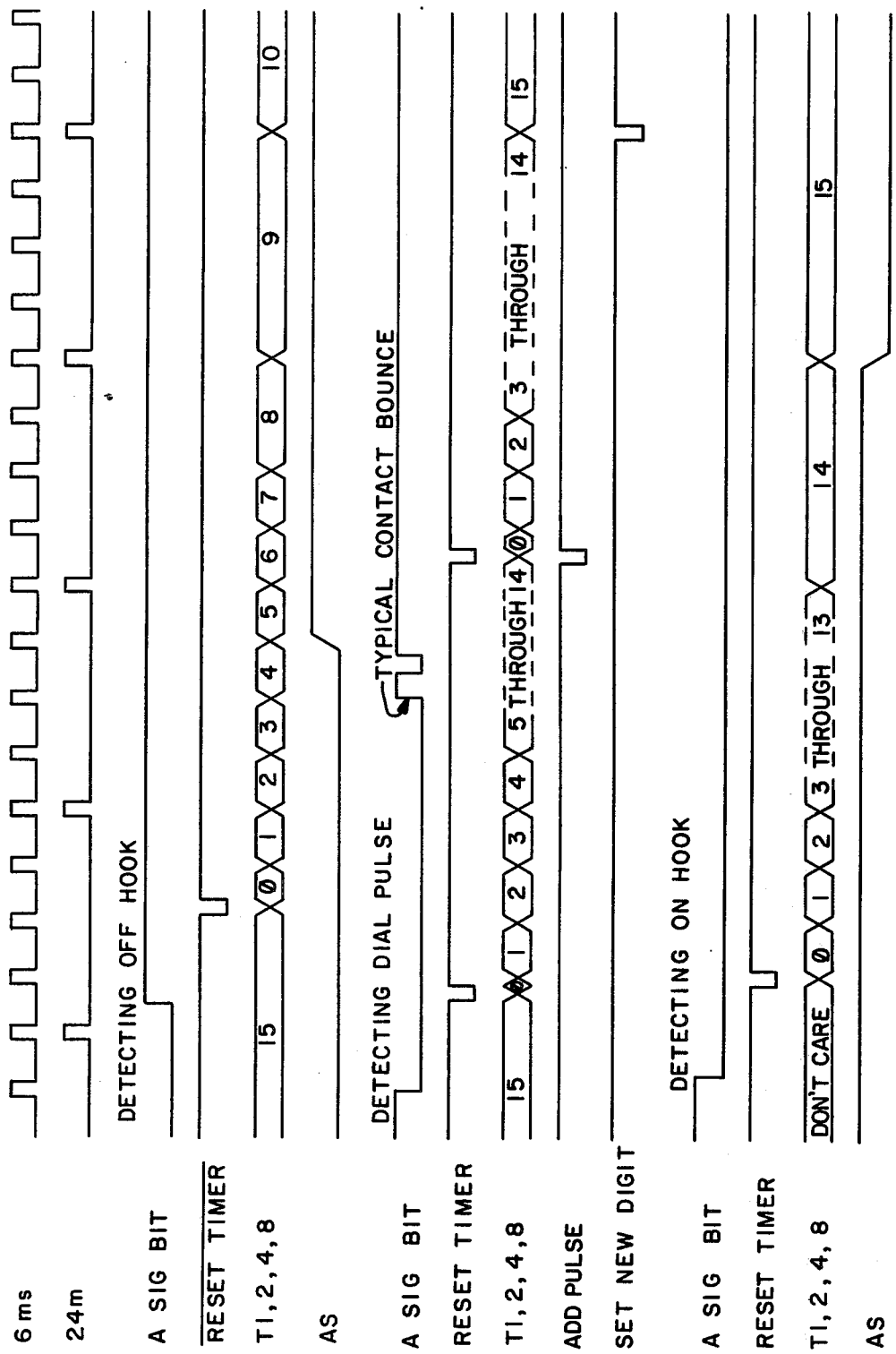
FIG.—24

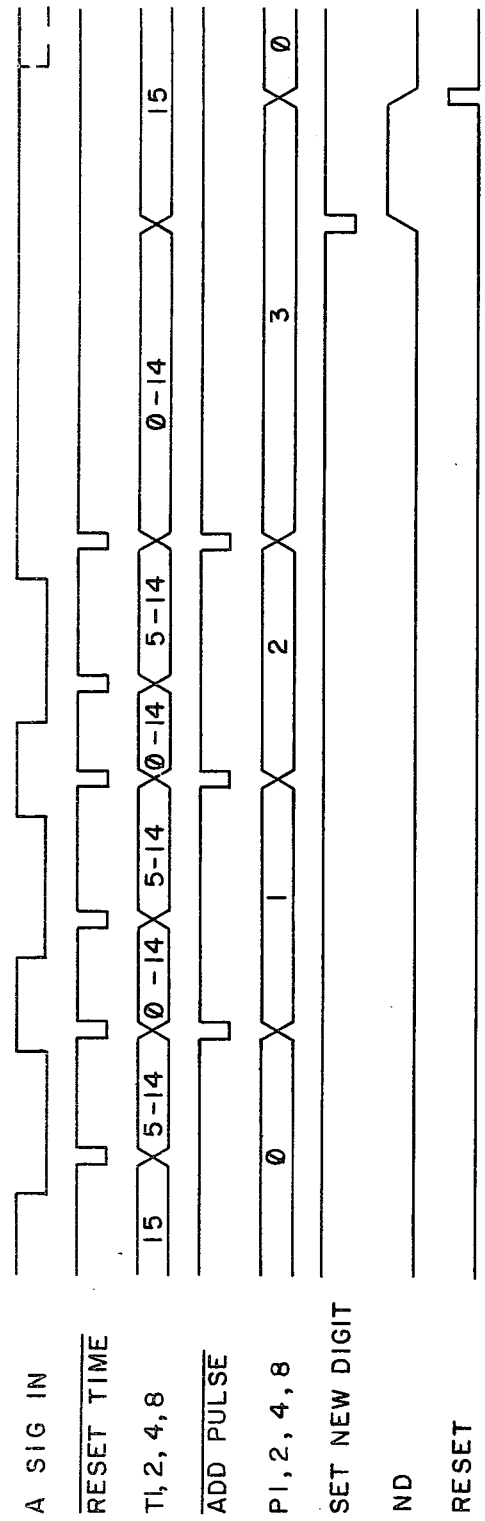
FIG.—25
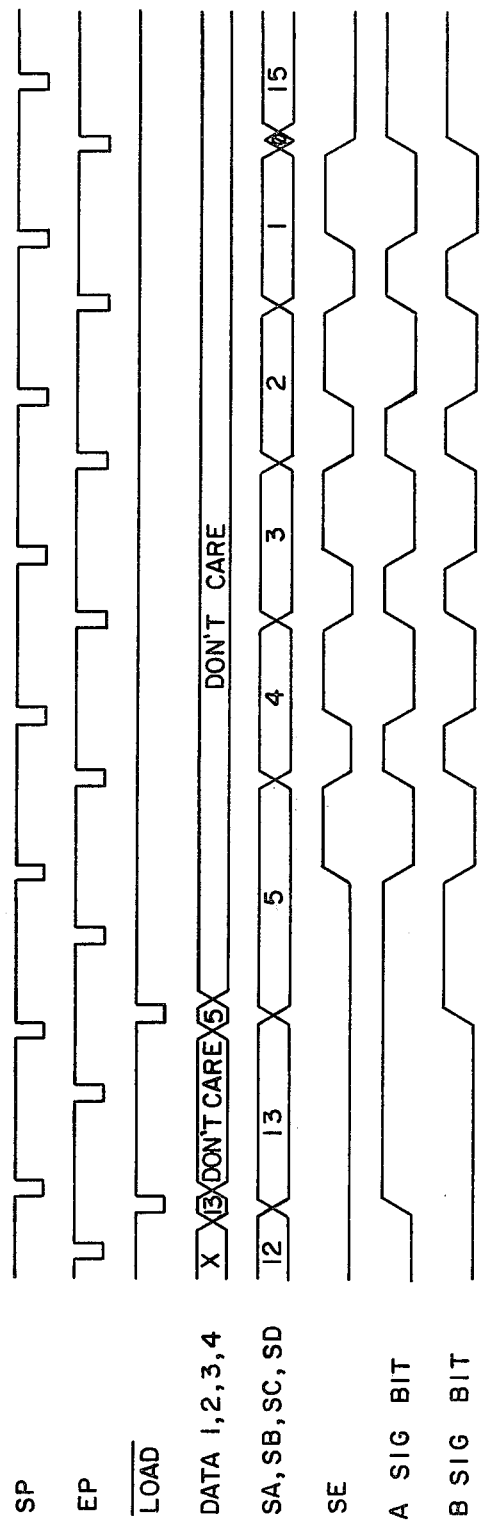
FIG.—26

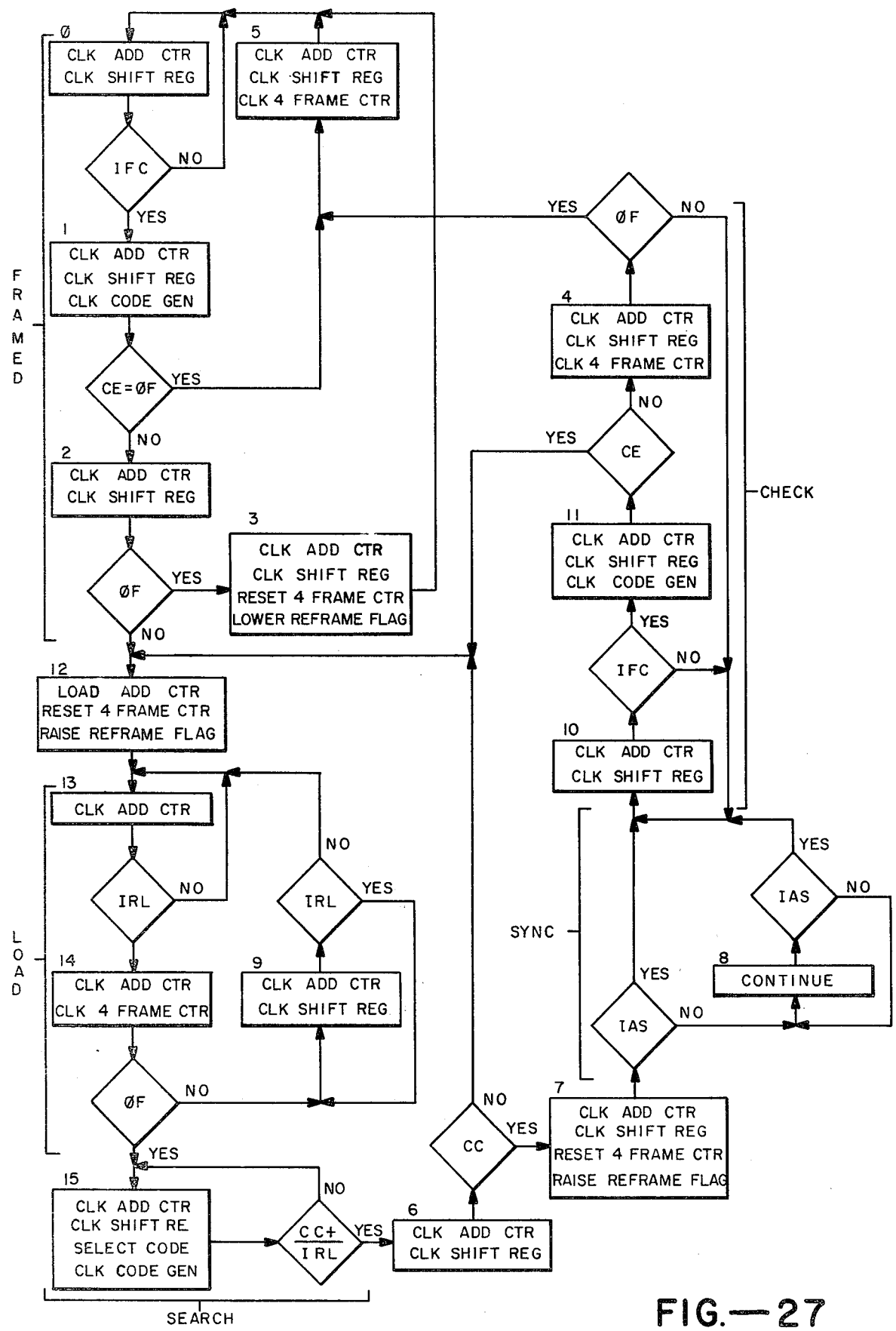
FIG.—27

DATA PULSE REGISTER/SENDER FOR A TDM SWITCHING SYSTEM

CROSS REFERENCE TO RELATED APPLICATIONS

1. INTEGRATED MESSAGE ACCOUNTING SYSTEM, Ser. No. 781,348, filed Mar. 25, 2977, invented by John C. McDonald and James R. Baichtal, and assigned to the same assignee of the present invention.

2. TIME SLOT INTERCHANGER, Ser. No. 762,811, filed Jan. 26, 1977, invented by Craig Schaffter, and assigned to the same assignee of the present invention, now U.S. Pat. No. 4,071,703, issued Jan. 31, 1978.

3. MULTIFREQUENCY SENDER/RECEIVER IN A MULTI-TIME SLOT DIGITAL DATA STREAM, Ser. No. 762,809, filed Jan. 26, 1977, invented by Bradley A. Helliwell and James R. Baichtal, and assigned to the same assignee of the present invention.

4. A DOUBLE REDUNDANT PROCESSOR SYSTEM, Ser. No. 781,437, filed Mar. 25, 1977, invented by John C. McDonald and James R. Baichtal, and assigned to the same assignee of the present invention.

5. SERVICE GENERATOR CHECKING APPARATUS AND METHOD, Ser. No. 762,808, filed Jan. 26, 1977, invented by Johannes R. Moed, and assigned to the same assignee of the present invention, now U.S. Pat. No. 4,071,704, issued Jan. 31, 1978.

6. PATH TEST APPARATUS AND METHOD, Ser. No. 762,934, filed Jan. 26, 1977, invented by James R. Baichtal and assigned to the same assignee of the present invention.

7. SERVICE GENERATOR FOR GENERATING A PLURALITY OF TONES, Ser. No. 762,810, filed Jan. 26, 1977, invented by Johannes R. Moed, and assigned to the same assignee of the present invention.

BACKGROUND OF THE INVENTION

The present invention relates to a telephone system operating in time frames each consisting of a plurality of time slots and more particularly to a dial pulse register/sender.

The register/sender recognizes and generates supervisory signals such as on hook, off hook, and dial pulse to make connections in the telephone system.

In a pulse code modulated (PCM) digital switching system, a multiplicity of conversations are multiplexed serially along a two wire digitally multiplexed line commonly known as a T1 line. A plurality of T1 lines are multiplexed together into what is known as a line group. Each T1 line carries 24 PCM channels or time slots with a basic time frame of 125 microseconds. Each time slot is allocated 8 bits in which the sample conversation between a calling party and a called party is digitally represented in PCM format. One frame is equivalent to 125 microseconds and equals 1 frame bit plus 24 time slots of a T1 channel of 8 bits each of 193 bits per frame. The sample or frame rate is 8 kilohertz (the reciprocal of 125 microseconds). A typical frame structure includes 12 frames of 193 bits each. In a 12 frame format, the 8th bit of each time slot in frames 6 and 12 carries a signaling bit.

The signaling bits are used by the register/sender to detect the supervisory signals on hook, off hook, and dial pulse.

Heretofore, the number of register circuits required in a telephone system were based upon traffic distribution probabilities. If a large number of subscribers were to simultaneously require a register, some subscribers would not be able to complete the call because of physical limitations of the register.

Also, the prior art utilizes both on-hook and off-hook timers to digitally time changes of state of incoming signaling bits.

In accordance with the above described background, there is a need in a telephone system for an improved register/sender capable of detecting and generating supervisory signals such as on-hook, off-hook, and dial pulse for each time slot regardless of traffic distribution probabilities. It is desirable to avoid including both an on-hook and off-hook timer in the register, thereby resulting in less hardware.

SUMMARY OF THE INVENTION

The present invention relates to a register/sender in a telephone system operating in time frames each consisting of a plurality of time slots for selecting and sending supervisory signals in dial pulse format. The supervisory signals occur as a signaling bit during the signaling frame of a multiframe format.

The register/sender includes a register for detecting the change of state of a supervisory signal during a signaling frame for each of the time slots. The register provides a change of state signal for each time slot when the supervisory signal has changed from one state to another state for a predetermined period of time.

In accordance with one feature of the invention, the register includes a timer responsive to the change of state of a supervisory signal. The timer includes an adder for incrementing once each signaling frame to not more than a first predetermined count. The timer also includes memory means connected to receive the count from the adder for each of the time slots. The timer also includes logic means responsive to the count for generating a change of state signal when the count reaches a predetermined count. The change of state signals include add pulse, on-hook, off-hook and new digit.

The register includes an integrator for filtering contact bounce of the supervisory signals.

The register includes a pulse counter for counting the number of digits detected by the timer.

The register/sender also includes a sender for connecting a supervisory signal such as on-hook, off-hook or dial pulse to each time slot in the telephone system.

In accordance with the above summary, the present invention achieves the objective of providing an improved register/sender for detecting and sending supervisory signals in dial pulse format.

Additional objects and features of the invention will appear from the following description in which the preferred embodiments of the invention have been set forth in detail in conjunction with the accompanying drawings.

DESCRIPTION OF THE DRAWINGS

FIG. 1 is a block diagram of an integrated message accounting system in accordance with the present invention.

FIG. 2 is a representation of the time slot frame structure employed within a multiframe format.

FIG. 3 shows the frame bit code utilized by the integrated message accounting system of FIG. 1.

FIG. 4 shows the system time slot organization of the integrated message accounting system.

FIG. 5 shows a block diagram of a T1 input portion of the I/O interface of FIG. 1 which is a portion of the FIG. 1 system.

FIG. 6 shows a block diagram of a T1 output portion of the I/O interface of FIG. 1 which forms part of the FIG. 1 system.

FIG. 7 shows a block diagram of a digital switch which forms part of the FIG. 1 system.

FIG. 8 is a timing diagram for the system master clock of FIG. 1.

FIG. 9 shows a block diagram of the signal processor, which forms a portion of FIG. 1.

FIG. 10A shows a block diagram of the signal processor control, which forms a portion of FIG. 9.

FIG. 10B shows a block diagram of the system controller interface, which forms a portion of FIG. 9.

FIG. 11 shows a block diagram of the dial pulse register sender, which forms a portion of FIG. 9.

FIG. 12 is a timing diagram for describing the operation of the dial pulse register sender shown in FIG. 11.

FIG. 13 shows a block diagram of the dial pulse register which forms a portion of FIG. 9.

FIG. 14 shows a block diagram of the dial pulse sender which forms a portion of FIG. 9.

FIG. 15 shows a schematic diagram of an integrator, which forms a portion of FIG. 13.

FIG. 16 shows a schematic diagram of a B integrator, which forms a portion of FIG. 14.

FIGS. 17 - 18 show a schematic diagram for a digital timer, which forms a portion of FIG. 13.

FIG. 19 shows a schematic diagram for a pulse counter, which forms a portion of FIG. 13.

FIGS. 20 - 21 show a schematic diagram for a sender, which forms a portion of FIG. 14.

FIG. 22 shows a block diagram of a framing error/parity error receiver, which forms a portion of FIG. 9.

FIG. 23 shows a timing diagram for the integrator of FIG. 15.

FIG. 24 shows a timing diagram for the digital timer of FIGS. 17 - 18.

FIG. 25 shows a timing diagram for the pulse counter of FIG. 19.

FIG. 26 shows a timing diagram for the sender of FIGS. 20 - 21.

FIG. 27 shows an exemplary flow chart for describing the operation of the reframe control circuit, which forms a portion of FIG. 5.

DETAILED DESCRIPTION OF THE INVENTION

Referring to FIG. 1, the integrated message accounting system (IMAS) is seen in block diagram form. The IMAS can be used at class 4P toll points to process 1+ toll calls originating in class 5 offices, local calls, and other similar uses. It may be used as a LAMA (Local Automatic Message Accounting) system or as a CAMA (Centralized Automatic Message Accounting) system.

The basic functions of the IMAS are to provide recording of calls on magnetic tape, alternate routing for originating traffic, ONI operation, traffic monitoring reports, tandem routing for completing traffic, and WATS service (wide area telephone service). Further details of the IMAS are described in the above-referenced application entitled "Integrated Message Accounting System".

In FIG. 1, the span terminating equipment (STE) 86 is well-known equipment which functions to transmit, receive, terminate, monitor status of, or loop back the PCM bit streams of T1 lines used as digital trunks in connection with the IMAS.

The VB3 voice bank 87 is well-known equipment which provides time division multiplexing-demultiplexing, PCM encoding-decoding and terminal failure group alarm functions betwen 24 telephone circuits (VF and signaling) and a 1.544 MB/S bipolar pulse stream in D3 format. As seen in FIG. 1, VB3 87 provides appropriate inerfacing with tributary offices, toll network, WATS service, recorded announcements, local first selectors, and Operator Number Identification (ONI) positions. The pulse stream is applied to a T1 input/output interface in the IMAS digital switch. Individual trunks (channel units) are chosen and configured appropriately for each application.

In FIG. 2, the PCM data format in the STE and VB3 equipment is compatible with the American Telephone and Telegraph Company's D3 channel bank, the operation of which is well known. With a sampling frequency of 8,000 Hz for encoding PCM data, one timing frame equals 125 microseconds with 24 time slots per frame per T1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame for a D3 channel bank.

In FIG. 3, the frame bit occurs once at the start of each frame. It contains a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 1, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the lvel spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 1, the unit 20 is either a STE 86 or a VB3 87 unit as previously described. Data from STE/VB3 unit 20 is applied to both the primary and secondary interfaces of a line group 10. For example, data is input to T1 I/O primary interface 11 and the secondary I/O interface 15 via buses 34, 35, and 34, 36, respectively. Data is output from T1 I/O interfaces 11, 15 to STE/VB3 unit 20 via buses 41, 40 and 42, 40, respectively.

As seen in FIG. 1, primary and secondary interface redundancy is employed in all major subsystems in the IMAS to prevent a single point failure which could cause the system to go down. Faulty subsystems are automatically switched off line to provide minimum interruption to service. Further details of the subsystem redundancy are described in the above-referenced application entitled "Integrated Message Accounting System".

A line group 10 interfaces any T1 line pair such as lines 34 and 40 with four Time slot Interchangers (TSI) 21 designated TSI $\phi$-3. A primary T1 I/O Interface also interfaces the optional primary multifrequency sender (MFS) 13 and receiver (MFR) 14 with the TSI 21. A primary T1 I/O interference such as interface 11 accepts bipolar PCM data from a T1 line (34, 40) carrying information in D3 format (standard D3 decode transfer characteristic). A secondary (redundant) T1 I/O Interface such as Interface 15 also interfaces any T1 line pair such as lines 34, 40 with the TSI 21. Interface 15 also interfaces the secondary MFS 17 and MFR 14 with TSI 21.

Incoming data from a unit 20 is stored and synchronized by the I/O Interface such as interface 11 to the IMAS system frame. Data is converted by each I/O interface to 9 bit parallel (includes parity bit) and sent to the time slot interchanger (TSI) 21. Carrier group alarm (CGA) detection (B2=0) and signal bit recovery (Bit 8 of 6th and 12th frames) is also accomplished. Error signals and signal bits are sent to the primary signal processor (SP) 72 or secondary SP 75 for further anaylsis.

It is possible to operate 16 of these T1 I/O interfaces for each primary and secondary subsystem per line group. Each I/O interface accommodates one T1 line or one VB3 voice bank. Up to four line groups per system may be used. Further discussions of the various primary and secondary subsystems will be limited to the primary subsystem, although it will be understood that the discussion would apply with equal effect to the secondary susystem.

A line group organizes the voice frequency data from 16 T1 lines or 15 T1 lines and the MFS onto a 384 time slot data bus to the TSI's (TSI$\phi$-TSI3).

Referring to FIG. 4, one frame is equivalent to 125 microseconds or 193 bits. The frames recur at the 8KHz sampling frequency. There are 24 D3 channel numbers as indicated by N, and there are a total of 384 time slots of 324 nanoseconds each, with an additional two time slots for the frame bit. FIG. 4 shows how time slots are organized with respect to the incoming frame. The first 16 time slots are constructed of data from channel one of the 16 incoming frames. The next 16 times are from channl 2 and so on. Each T1 I/O interface is allocated to one of 16 time slots for each D3 channel. 16 T1 lines are each input to the respective T1 line I/O interface and multiplexed to time slots 0-15. P indicates the particular line group interface accessed during a channel number. For example, during channel number one, P1 would indicate primary I/O interface 11 and secondary I/O interface 15 of FIG. 1 is accessed, P15 would indicate primary I/O interface 12 and secondary I/O interface 16 are accessed. P16 would indicate primary multifrequency sender 13 and secondary sender 17 of FIG. 1 are accessed. If the line group did not employ a multifrequency sender and receiver, P16 would indicate accessing another I/O interface. During channel 24, P16 would indicate the primary MF receiver 14 and secondary MF receiver 18 are accessed. The D of FIG. 4 indicates the decimal time slot for the line group from 0-385. D3 channels 1-3 are assigned to the MF sender. D3 channels 17-24 are assigned to the MF receiver and D3 channels 9-16 are assigned to either MFS or MFR, dependent upon traffic conditions.

In FIG. 1, the IMAS digital switch comprises line groups 0-3 and TSI O-3.

Referring to FIG. 1, the TSI 0-3 switch channel time slot data from any of the four line groups to any other channel time slot of any other of the four line groups. For example, data from line group 0 could be sent via bus 26-1 to TSI 0 and switched out bus 28-4 to line group 3. The TSI's receive channel time slot data (8 bits plus parity). When it is available from the line group data bus, the TSI's hold it until the proper time for output in the next frame and transmit the data to the line group data for output. The TSI contains control and data memory for all time slots. The TSI's communicate with both the primary and secondary system controllers (SC) 50, 64 via bus 57, 63. Further details of the digital switch are described in the above-referenced application entitled "Time Slot Interchanger".

In FIG. 1, the primary and secondary service generators (SG) 22, 23 provide capability to connect one of several standard tones in PCM format to any of the channel time slots. These tones include 1,000 Hz, 120 IPM busy, 60 IPM busy, dial tone, ring back tone and internal tones for the IMAS. The primary and secondary SC22, 23 receive control signals from the respective system controller (SC) 50, 64. Further details of the service generator are described in the above referenced application entitled "Service Generator For Generating A Plurality of Tones".

The primary and secondary signal processors (SP) 72, 75 monitor all the input channels of the IMAS for changes of state and dial digits. Each time a channel is seized or released, or a digit is dialed, a message is sent to the respective SC 50, 64 via buses 74, 77, containing the channel number and the event. All the information needed to determine the changes of state or dial digits is time division multiplexed over several leads originating from the line group.

The SP 72, 75 also have the capability to seize or release channels or dial digits on these channels. Frames 6 and 12 are signaling frames. During these frames, the least significant bit of the 8 bit PCM byte is replaced with a signaling bit. Frame 6 is used for an A signaling bit and frame 12 is used for a B signaling bit. The signal processor uses the A signaling bit for seizure, release and dial digit detection. The B signaling bit is used for state change detection only. Further details of the signal processor are described subsequently.

In FIG. 1, the primary and secondary system Master Clock 79, 78 is a conventional device for generating all basic clock signals used by the IMAS. The clock generates 4 clock signals MCLK$\phi$-MCLK3 all of which are 3.088 MHz square waves, but each one is phase shifted by 270 ns nominal. The purpose of this phase shifting is to allow for propagation delay of data as it is routed through the different subsystems contained in the IMAS.

Referring to FIG. 8, the basic frequency of the system master clock is a crystal generated 18.528 MHz. The basic frequency of the system master clock is divided down to the 3.088 MHz square wave.

Master frame pulses PS$\phi$-FS3 generate a 648 ns pulse every 125 us and are used to mark the start of a new frame. FS$\phi$-FS3 are primarily used by subsystems to synchronize their address generators.

The master frame bit signal FB$\phi$-FB3 generate a repeating pattern of serial bits. The pattern repeats every 12 frames and the bits can be decoded tp identify each of the 12 frames as seen in FIG. 3.

Again referring to FIG. 1, in addition to the clock signals of FIG. 8 originating from the master clock, an "Active" signal originates from the system controller 50, 64 of FIG. 1 to inform some of the IMAS subsystems that they are on line.

In FIG. 1 the operator number identification subsystem (ONI 80) provides a control interface between the IMAS and ONI operator positions for serving lines not equipped with automatic number identification (ANI) or for calls experiencing ANI failure.

The MF senders (MFS) 13, 17 generate and output MF tone pairs onto the line group data bus 26-1, 44-1 for switching through the time slot interchangers 21 to an outgoing path such as 28-4, 46-4. The MFS 13, 17 communicate directly with system controllers 50, 64 via buses 37, 47, respectively. The MF receivers (MFR) 14, 18 detect MF tones in PCM digital input form and send them to the SC 50, 64 via buses 38, 48, respectively.

The MFS and MFR jointly share one group of 24 D3 time slots and associated control facilities. A minimum of 8 time slots and a maximum of 16 time slots for each sender such as MFS 13 and each receiver such as MFR 14 are available to traffic at any time subject to a total maximum of 24 time slots. Systems with more than one line group may be equipped with the above capacity per line group as required by traffic. Further details of the MF sender and receiver are described in the above-identified application entitled "Multifrequency Sender/Receiver in a Multitime Slot Digital Data Stream".

The primary and secondary system controllers (SC) 50, 64 are Intel 8080A stored program controllers surrounded by a number of peripheral devices and interfaced to each subsystem. The System Controllers provide the following functions:

(1) call processing including routing, ANI (Automatic Number Identification), ONI, recorded announcement control and creation of billing records.

(2) SC self test (3) system test and maintenance data outputs for accumulation of traffic monitoring data and generation of traffic monitoring reports. The secondary (redundant) SC 64 is updated continuously so that it can assume control of the system with a minimum disruption to service should primary SC 50 experience a failure. Further details of the system controller are described in the above-referenced application entitled "A Double Redundant Processor System".

The peripheral devices connected to the System Controllers 50, 64 are as follows:

The CRT 51 which is used for:

a. Primary system information display (e.g., traffic, alarms, maintenance program results)

b. Keyboard entry of system control commands and data (e.g., translation table data, trunk-type assignments, test trunk control, and system diagnostic control)

The CRT 51 is the primary system interface to office personnel.

Printer 67: provides printed output records of traffic, alarms, maintenance diagnostics and other system data. In the event of CRT 51 maintenance of failure, the printer may be used as a substitute input-output device.

MTR 52 — The magnetic tape recorder is the primary system billing recording device. The MTR 52 records can be read by a similar industry standard MTR in an EDP data center. MTC 53 —to A magnetic tape cartridge recorder is associated with each SC, primary and secondary. The MTCs are used to load standard programs and office data from tape cartridges. Additionally, the secondary MTC is used as a backup recording device when the MTR is not in service. RTC 54, 65 — The Real-Time Clock generates the stable time bases for timing all programs in each SC 50, 64. COI 55, 56, 68, 69 — Control Office Interfaces are used to interface signals in and out of the CO (e.g., Dynamic Overload Control Signals — DOC).

Office Connection Panel 71 — the OCP contains terminal blocks for connection of the system to office alarms, DOC and other office signals as required.

Status and Alarm Panel 70 — the SAP provides basic system status and alarm display and allows limited, direct control of essential functions. It communciates with the SC via COIs.

Test Trunk Panel 88 — the TTP provides jackfields and access to voice and signaling of two 4-wire trunks assigned as system test trunks. Pushbutton switches on the panel allow for talking, dialing and testing on each trunk, for patching together the two test trunks and for momentary monitoring of a call in progress.

ANI Adapter 83 (optional) — provides interface facilities between standard local identifiers and the IMAS SC and VB3 trunks.

An example of a call processing overview of the IMAS will be given to provide a better understanding of the operation of the present invention. The overview will be given in conjunction with FIG. 1 and assumes that the primary portion of the IMAS is on-line. The secondary portion of the IMAS is off-line but would automatically be switched on-line should the primary portion experience a failure. Therefore, the description of the call processing overview as it applies to the primary portion of the IMAS will apply with equal effect to the secondary portion.

Call Overview

Referring to FIG. 1, a subscriber in a tributary office 90 goes off hook, receives a dial tone from the local office and dials "1" to initiate a 1+ direct distance dialing (DDD) call. This causes a 1+ call toll connecting trunk 92 to the IMAS to be seized (go off hook) at the tributary office 90. The seizure is passed into the IMAS through STE/VB3 unit 20 as a change of state of a signaling bit on a T1 line such as 34, 40 entering a T1 I/O interface such as interface 11. The seizure is recognized by the signal processor 72 which passes the change in trunk state to the system controller (SC) 50. The Controller 50 begins a process of building up a Call Processing Record. As the subscriber dials a called number, the signal processor (SP) 72 detects each dialed digit and forwards it to the SC 50 for storage in memory.

At the appropriate time, the Controller 50 signals the tributary office 90 via the SP 72 to initiate calling number identification. The tributary identifier in the tributary office 90 is activated, the SC 50 connects an MF receiver (by assigning the MFR 14 to a time slot corresponding to the time slot occupied by the 1+ originating trunk 92) and the Calling mumber information is passed to the MFR 14. The MFR 14 forwards each digit received to the SC 50 where this information is assembled in memory with called number and other information necessary to form a complete record for eventual use as a billing record.

With called number information in the memory of the SC 50, the controller 50 proceeds to perform a translation (3 digits or 6 digits as required). An outgoing trunk group connected to Toll Network 91 is chosen and an idle outgoing trunk such as trunk 93 is selected. The digital switch (consisting of line group 10 and time slot interchanger 21 paths) is set up and path tested for path continuity. The MF sender 13 is commanded by the SC 50 to out pulse an MF tone. Alternatively, dial pulse sending (DP) is also possible using the SP 72.

The SP 72 monitors the state of the outgoing trunk 93 after outpulsing and initiates call timing in the SC 50 at answer supervision by using the real time clock 54 associated with the SC 50. The SP 72 continues to monitor the state of the outgoing trunk signaling until the call is terminated. At this point, the SP 72 informs the SC 50 that the subscriber associated with the tributary office 90 went back on hook. The SC 50 then assembles a billing record in its output memory buffer area. When a block of 16 billing records is present in the buffer area, it is written on the output magnetic tape recorder (MTR) 52.

The information contained in a call record is: the date; connecting time; elapsed time in minutes and seconds; originating number; terminating number; type code; class code; information code; time and charge code; trouble code; CPFR code; incoming trunk ID; outgoing trunk ID; and toll center number.

Referring to FIG. 5, the input portion of the T1 I/O interface 11 of FIG. 1 accepts serial bipolar PCM data from a T1 line 35 carrying information in D3 format. Each time slot of incoming data comprises 8 bits of PCM sampled data so that there are 192 bits for 24 channels per T1 line plus one framing bit. Incoming data is stored and synchronized to the IMAS system frame. Serial data is converted to 9 bit parallel (8 bits data plus parity bit) and sent to the time slot interchanger (TSI). Carrier group alarm (CGA) detection (Bit 2=0) and signal bit recovery (Bit 8 of 6th and 12th frames) is also accomplished. Error signals and signal bits are sent to the signal processor for further analysis.

It is possible to operate 16 of these interfaces per line group. Each interface accommodates one T1 line or VB3 voice bank. Up to 4 line groups per system may be used.

Incoming PCM data on Bus 35 from the unit 20 is converted to normal TTL levels by a conventional Unipolar Converter 102 and gated through the conventional Data Select 131 on Bus 103 by an Active signal applied to the line group in response to the Master Clock 78 under control of the system controller 50 of FIG. 1.

The Master Clock 78 provides the necessary timing signals to the Input Timing Generator (ITG) 129 via bus 60. The ITG 129 includes conventional counters and logic to distribute common miscellaneous timing functions to the various subsystems of the I/O Input Interface of FIG. 5. The conventional Clock Recovery circuit 110 receives the PCM data and reconstitutes a clock signal to provide a clocking edge that lags the data bit by one quarter period of the square wave period. Data is loaded from Data Select 104 into a holding buffer in the Elastic Store 106, a 256 bit store, via bus 105 until the next available write window from the Read/Write Control (RWC) 120. The Read/Write Control 120, a typical selector circuit to insure there is no interference between read and write times, then gates the Write Address Counter 118 through a conventional Address Select Circuit 129 to the Elastic Store 106 and writes the data bit at this address location on a 256 × 1 bit RAM. The Write Address Counter 118 is 8 bits wide (to address 192 bits of data per T1 line) and free running at 1.544 MHz. Since the system clock has a basic frequency of 3.088 MHz, it will have 2 rising edges per incoming data bit; thus there are two available write windows per incoming bit to assure that each bit will be written in the Elastic Store 106 regardless of the phase or jitter of the recovered incoming clock with respect to the master clock timing of the ITG 129.

When the line group is not active, data from the output interface of FIG. 6 is looped around through Data Select 104 of FIG. 5 via Bus 199. This allows off line checking of a line group to be sure that it is ready for service, the details of which are more fully described in the above-identified application entitled "Service Generator Checking Apparatus And Method".

The Reframe Control Circuit 144 controls the state of the Read Address Counter 154, and clocks the appropriate data bit from the Elastic Store 106 into the Serial To Parallel Converter 136 via Bus 132. Converter 136 is a conventional shift register. When the 8 bit word (D3 format) of a T1 channel is present in the Serial To Parallel Converter 136, it is clocked into the Output Buffer 140 via 8-Bit Bus 138 by the ITG 129 along with a parity bit from Parity Generator 134 computed at the input to the Serial To Parallel Converter 136. ITG 129 then sequentially connects this output buffer 140 in its turn with 15 other input interface circuits of the FIG. 5 type to the TSI bus 26-1 through Line Driver 143 and bus 24-1 to the TSI of FIG. 7. TSI bus 26-1 is a conventional three-state bus that is accessed by the other fifteen T1 input interfaces in their turn to form 384 (16 × 24 D3 channels) time slots. The 16 input interface circuits each with their 24 T1 channels (D3 format) form the 384 (16 × 24) channels per line group.

Once per frame, the Reframe Control 144 compares the frame bit at the appropriate position in the Serial To Parallel Converter 136 with its own frame code generator. If two or more errors in four frames occur, a reframe mode is initiated. Reframing is accomplished by adjusting the delay through the Elastic Store 106. A frame error signal appears on bus 147 for transmission to SP 72 of FIG. 1 via Bus 73-1.

The Reframe Control 144 includes a comparator, four frame counter and processor, which includes a PROM and data selector. A group of data bits in the vicinity of the system frame bit time is inspected for potential frame bits. Each bit position is checked until it either produces the correct framing sequence for ten frames or one error in a potential sequence is detected. When the entire group has been checked and no frame code sequence has been found, the Read Address Counter 154 is advanced to select the next group of bits. This process continues until the above mentioned framing sequence is found. The "found" bit position is synchronized with the system frame bit position by delaying the Read Address Counter 154 and a framed condition is reestablished.

An exemplary flow chart for describing the operation of the processor contained within the reframe control is shown in FIG. 14. The processor of reframe control 144 will execute the following steps for finding the framing bit for the line group.

In FIGS. 3 and 4, the frame bit position shown occurs once at the start of each frame. It contains a framing code that takes 12 frames to repeat.

Referring to FIG. 14, steps 0, 1, 2, 3 and 5 are executed in a sequence when the reframe control 144 is in a framed condition. The read address counter 154 and converter 136 of FIG. 5 are continuously being clocked once per incoming bit. Thus the read address counter 154 keeps pace with the write address counter 118.

The processor will wait at step 0 until IFC (input frame control) decision sends it to step 1. IFC is a typical signal from the ITG 129 of FIG. 5, which occurs one D3 time slot after the frame bit. If IFC is no, the processor returns to step 0. If IFC is yes, the processor proceeds to step 1.

At step 1, the frame code generator/comparator (internal to the reframe control 144) is clocked to keep its internal frame bit up to date. In addition, the Address Counter 154 and Converter 136 of FIG. 5 are incremented as in step 0.

At this point the incoming frame bit FB is compared with the internal frame bit. Assuming the four frame counter is at frame 0, if no code error is detected (CE=OF) the processor will continue to step 2 and clock the address counter 154 and converter 136 of FIG. 5.

From step 2, the processor goes to step 3 if the four frame counter is at frame zero in its count where the four frame counter is kept reset and a reframe flag is lowered. Lowering the reframe flag will apply the appropriate flag state to the most significant bit of the four frame counter when being loaded.

The processor returns then to step 0 and repeats the cycle.

In step 1, if the frame code generator does detect a code error, at frame zero or no code error at frames 1, 2, or 3 (CE=OF is a yes condition), the processor branches to step 5 where the four frame counter is incremented to the next state. The cycle repeats until the four frame counter returns to 0 or another code error occurs. A second error in four frames causes the reframe mode to be entered at step 12 via step 2.

At step 12, the reframe flag is raised when the four-frame counter is reset. Raising the reframe flag applies the appropriate reframe flag stage to the most significant bit (MSB) of the four frame counter when being loaded. Also, the read address counter 154 of FIG. 5 is advanced 8 counts with respect to the write address. For 3 consecutive frames, the 8 bits in this frame position are loaded into converter 136. This is accomplished in steps 13, 14 and 9 and is controlled by decision IRL (input reframe load) and the four frame counter of reframe control 144. IRL is another timing signal from ITG 129 of FIG. 5.

When the four frame counter returns to frame 0, the processor branches from the load loop to state 15. At this point the 4th set of 8 bits together with the three previous sets of 8 bits form 8 4-bit words that are clocked into the frame code generator and inspected one at a time for any of the twelve codes shown in FIG. 3. If one is found, the code compare (CC) indicates that a potential frame code sequence has been found and the processor goes to step 6. If no valid code is found the processor branches to step 6 after the 8th word has been inspected.

Referring to FIG. 14, at step 6, the processor checks CC to see if it has terminated the search mode. If not the processor jumps back to step 12 to repeat the process for the next 8 bits in the frame. If CC is a yes, then the sync mode is entered at step 7.

In steps 7 and 8, the four frame counter is set to zero to prepare for the check mode, and the position of the found code is synchronized to the system frame bit position by decision IAS (input address sync), a timing signal from ITG 129 of FIG. 5.

Steps 10, 11 and 4 are the check mode in which the processor inspects the FB position in the normal manner for 3 more frames, after rechecking the found bit. Decision CE (code error) indicates that the incoming frame bit is not equal to the frame code generator bit. If CE is yes, it will cause the processor to jump back to step 12 to repeat the process. Otherwise the four frame counter returns to 0 and the processor branches to step 5. Three more FB positions are checked for errors with a single error causing a return to step 12 via step 2.

After 10 consecutive FB positions containing no errors have occurred, the processor restores a framed condition at step 3.

In FIG. 5, signal bits are written into the Signal Bit Store 150, a 32 × 4 bit RAM, during frames 6 and 12, as determined by the internal frame code generator of the Reframe Control 144 from the appropriate output of the Serial To Parallel Converter 136. Since the Reframe Control 144 synchronizes the incoming frame bit to the nearest system frame bit position, the incoming frame number bears no relation to the current system frame number. Therefore, signal bits from the Signal Bit Store 150 are allowed to stay on line for 12 consecutive frames to be sure they are valid during the system signaling frames.

During normal operation, the second bit position (next to the most significant bit) in all 24 words is inspected by conventional Detector 148. If all 24 bits are zero, then a B2=0 signal appears on bus 149 which is sent to SP 72 of FIG. 1 via Bus 73-1.

The B2=0 means that all 24 bit 2 positions in one frame (D3 format) are 0. This is a carrier group alarm (CGA) sent by the associated D3 equipment. The framing error has priority over the B2=0 error.

Signal bits, B2=0 error signals, and framing errors are applied to the SP bus 73-1 and sent to the SP in the same manner as data sent to the TSI. These signals are processed and relayed to the System Controller to give trunk status information.

Path tests are performed to insure that the particular path is or is not set up through the TSI. The Path Test Generator (PTG 156) receives a command from the SP via bus 73-2 to invert the parity bit of the channel under test. The parity is inverted at line driver 143. Parity checking of all output interfaces discloses the results of the path test. Further details of the path test are described in the above-identified application entitled "Path Test Apparatus and Method".

Referring to FIG. 6, the output interface accepts data from the TSI and Signal Processor (SP) in parallel form. It is converted to a serial format and then to bipolar PCM to be applied to the T1 line. During signaling frames, signal bits from SP are inserted at the appropriate place in the parallel word. The signaling frames in the IMAS are frames 6 and 12 with the 8th bit of each channel time slot allocated for a signal bit to indicate on-hook or off-hook status. Also, a zero suppression circuit maintains at least a 1 out of 16 pulse density on the T1 line. The zero suppress circuit monitors all 8 bits being applied to the parallel to serial converter. If all 8 bits are 0, Bit 7 is forced to a one. This insures that no more than 15 consecutive zeros will appear in a T1 stream, a condition necessary to keep clock recovery circuits alive. A parity check is made of all data. Parity errors are sent to the signal processor for analysis.

It is possible to operate 16 of these interfaces per line group. Each interface accommodates 1 T1 line or VB3 voice bank. Up to four line groups per system may be used.

Referring to FIG. 6, the output portion of the I/O Interface 11 of FIG. 1 is shown in more detail. Data from the TSI is applied to the conventional Input Buffer 167 via Line Receiver 165 and buses 28-1, 30-1.

The Output Timing Generator (OTG) 196 loads Input Buffer 167 whenever an outgoing PCM word appears on the bus 30-1. The OTG 196 is similar to the ITG 129 of FIG. 5. When 16 words have been loaded (1 word in each buffer for up to 16 interfaces), the conventional Parallel To Serial Converter 171 in all of the interfaces is loaded with this data. The serial data immediately starts shifting out on the T1 line 41 via the Bipolar Converter 179 and the T1 Line Driver 181. The Active signal from Master Clock 78 of FIG. 1 controls a pair of relays that connect the T1 Line Driver to the T1 line. The primary and secondary interfaces are connected in parallel at the T1 line. Therefore the off-line driver is disconnected by the relays.

During system frames 6 and 12, signal bits are inserted at Bit 8 via the Signal Select 175, which is similar to data select 104 of FIG. 5. In FIG. 6, signal bits are received from the signal processor via bus 73-3, 192 and line Receiver 191, and are loaded with parity in the same manner as data from the TSI. Bus 73-3 corresponds to Bus 73 of FIG. 1.

In FIG. 6, the Zero Suppress circuit 174 is a comparator circuit that monitors all 8 bits being applied to the Parallel To Serial converter 171. If bits 1-6 and 8 are 0, Bit 7 is forced to a 1. This insures that no more than 15 consecutive zeros will appear in a T1 stream, a condition necessary to keep clock recovery circuits alive.

The conventional Parity Checker 184 is preset to its start state at the beginning of each serial word. The preset state is determined by monitoring data parity, signal parity if frames 6 or 12, and the Zero Suppress circuit 174. The Parity Checker 184 computes parity on the serial word as it is applied to the input of the T1 Line Driver 181. The proper parity error condition exists at the end of the serial word and is loaded into the Parity Muxer 186 along with the 15 other parity error conditions. The Parity Muxer 186 sends the 384 channels of parity error data per frame to the Signal Processor 72 of FIG. 1 via Line Driver 188 and buses 187, 73-2. Bus 73-2 corresponds to Bus 73 of FIG. 1.

In FIG. 6, the frame bit is always applied to the serial input of the Converter 171. The OTG 196 only allows the frame bit to shift through to the output at the appropriate frame bit time.

When a line group is off line, the Active signal will select data from the Bipolar Converter 179 instead of data from the Unipolar Converter of the T1 input interface of FIG. 5. This allows a loop around test to be performed by the Service Generator (SG) 22 of FIG. 1. The T1 input interface frames up on the serial T1 stream from the output section allowing TSI output bus data to be looped around to the TSI input bus. Further details of the loop around test are described in the above-identified application entitled "Service Generator Checking Apparatus and Method".

Referring to FIG. 7, the timed division multiplexed PCM digital switch network configuration used in the IMAS is shown. The digital switch comprises line groups 0-3 and TSI 0-3 of FIG. 1. Network paths have been derived by multiplexing together sixteen 24-channel T1 lines in a line group to form 16 × 24 or 384 time division channels or time slots. In a full size IMAS there are 4 line groups 10 for a total of 1536 terminations or channels. Each line group has primary and secondary redundancy as previously described, but not shown here. The channels appear sequentially on the horizontal input paths 26-1 to 26-4 of the network and are switched to the desired outgoing paths 28-1 to 28-4 by the time slot interchanger TSI $\phi$-3, associated with the vertical paths 208-1 to 214-4 of the network.

As an example, assume a call is in progress from LG0 to LG1 through TSI O. In operation, under control of the System Controller 50, an originating channel sample from one of the T1 lines is multiplexed out on a horizontal path such as path 26-1 as one of 384 time slots for the group. The data is switched to a vertical path such as 210-1 to TSI O. The TSI O transfers the sample to its memory, where it is held until the terminating channel time slot in the next frame appears, whereupon the sample is transferred back on path 208-1 and switched to a path such as 28-2 to the line group LG1 and the T1 line on the terminating channel. Further details of the TSI are described in the above-identified application entitled "Time Slot Interchanger".

Referring to FIG. 9, the primary signal processor (SP) 72 of FIG. 1 is shown in more detail. The signal processor includes SP control 301, system controller (SC) interface 302, dial pulse register/sender 303, and framing error/parity error receiver 304.

The dial pulse register/sender 303 includes dial pulse register 305 and dial pulse sender 306.

Receiver 304 includes parity error receiver 371, framing error receiver 378, and signaling bit buffer 383. There is one dial pulse register/sender 303 and one receiver 304 per line group.

The interconnections of the various components of FIG. 9 will be described in more detail in conjunction with the description of FIGS. 10–22.

The System Controller Interface 302 of FIG. 9 handles all communications between the System Controller 50 of FIG. 1 and the Signal Processor 72. This is accomplished with two Universal Asynchronous Receiver Transmitters (UART). Each time the System Controller 50 communicates with the Signal Processor 72, it sends a three byte message containing the channel and line group number, and a 5 bit coded command. The Signal Processor 72 then sends a 1 byte response.

Each time the Signal Processor 72 communicates with the System Controller 50, a three byte message is sent, and the System Controller sends a 1 byte response.

The signal processor (SP) monitors all the input channels of the IMAS for changes of state and dialed digits. Each time a channel is seized or released, or a digit is dialed, a message is sent to the system controller containing the channel number and event.

All the information needed to determine the changes of state or dialed digits is time division multiplexed over several leads originating from the line group. The SP also has the capability to seize or release channels, or dial digits on these channels.

Messages sent in the code by the SC are state changes, digits to be dialed, status requests, and path tests. Messages sent by the SP are change of trunk status, dialed digits, parity errors, framing and B2=0 errors.

Upon receipt of a status request, the SP sends the status of the trunk in question back to the SC in the form of a change of trunk status message. The messages are organized as follows in the following Chart I.

Chart I

```
Bit         7 6 5 4 3 2 1 0
Byte 1      X X X X X X X X   low order channel number
Byte 2                    X   high order channel number
                      X X     line group number
            X X X X X         command
Byte 3      X X X X X X X X   complement of byte 2
```

The commands are as follows:
1) From System Controller to Signal Processor

```
Bit 7 6 5 4 3
    φ φ φ φ φ         status request
    φ φ φ φ 1         path test
    1 1 1 B A         status of A and B signaling
                      bits to be output
    1 (1 – 10)        dial pulse digit to be output
```

The Signal Processor response for these commands is:

```
Bit 7 6 5 4 3 2 1 0
                X     memory parity error LG # 0
              X       memory parity error LG # 1
            X         memory parity error LG # 2
          X           memory parity error LG # 3
        X             did not receive 3 bytes in time
      X               retransmit this message.
```

2) From Signal Processor to System Controller

```
Bit 7 6 5 4 3
    φ 1 1 B A         status change on A & B signaling bits
                      or reply to status request.
    1(1 – 10)         dial pulse digit received
    1 φ φ φ φ         parity error detected
    φ φ φ Y Z         Y = B2 = φ error, Z = framing error
```

The System Controller response for these commands is:

```
Bit 7 6 5 4 3 2 1 0
                X     disable parity errors for LG #0
              X       disable parity errors for LG #1
            X         disable parity errors for LG #2
          X           disable parity errors for LG #3
        X             reset parity error receivers
      X               reset framing error receivers
    X                 reset signal processor
  X                   retransmit this message.
```

The SC Interface 302 will provide appropriate signals to the other subsystems of the Signal Processor as will be described subsequently.

The SP control 301 of FIG. 9 is shown in more detail in FIG. 10. Control 301 generates all clock signals and addresses used in the signal processor with MCLK1, FS 1, FB 1, and MCLK 3 signals originating from the system Master Clock 78 of FIG. 1. MCLK 1 and MCLK 3 are both 3.088 MHz square wave slightly phase shifted to allow for propagation of data as it is routed through different subsystems. FS 1 is a 648 ns pulse that occurs every 125 us. The FS signal marks the beginning of each frame. The IMAS uses a twelve frame pattern where each frame is identified by a repeating sequence of signals over the FB 1 lead.

Frames 6 and 12 are signaling frames. During these frames, the least significant bit of the 8 bit PCM byte is replaced by a signaling bit. Frame 6 is used for the A signaling bit and frame 12 is used for the B signaling bit. The SP 72 uses the A signaling bit for seizure, release and dialed digit detection. The B signaling bit is used for state change detection only.

Referring to FIG. 10, the Signal Processor Control 301 is shown in more detail and includes a Frame Detector 360, a pulse generator which uses Master Clock signals MCLK1 ($\phi$1), FS1, FB1 and MCLK3 ($\phi$3) for generating the signals FP Reset, Reset, F1, F2, and Reset signal for the Clock Generator 361. The FP RESET signal marks the beginning and ending of the signaling frames 6 and 12. Signals F1 and F2 form a 2-bit code that divides the 12 frame format into 4 segments, frames 1–5, frame 6, frames 7–11, and frame 12. Conventional selector gates will utilize the F1 and F2 signals to enable, at the proper time, control signals from the Control 301 and Interface 302.

One of the purposes of the Signal Processor is to outpulse digits on the outgoing trunks. This is done by manipulating the A and B signaling bits for the trunk. The Dial Pulse Generator 364 is a conventional pulse generator for generating a pulse speed of 9.95 pulses per second with the percentage break adjustable from 95% to 65.5% in 1.5% increments. The dial pulse Generator 364 generates the signals SP and EP which are sent to the dial pulse register/sender. The SP pulse marks the beginning of the dial pulse break, and the EP pulse marks the end.

The Clock Generator 361 generates the DPRS, DRCLK, and ADRS CLK signals, which is used for incrementing address counter 362. DRCLK is used to load data into the SC Interface 302 of FIG. 9.

During frames 6 and 12, the Address Counter 362 increments every 324 ns, and during the other frames (1–5, 7–11) it is incremented every 1620 ns. The Clock Generator 361 changes the DPRS, DRCLK and ADRS CLK signals accordingly.

The Address Counter 362 includes a conventional binary counter to generate the channel address used in the signal processor. It is used primarily to address random access memories on other subsystems used in the SP. The Address Counter normally advances from 0–385 on address buses DP1–DP256. A parity generator is used for the signal PAR9, which is the odd parity bit for the 9 address lines. The signal PAR 4 is the odd parity bit for address lines DP1, DP2, DP4 and DP8.

The Path Test Circuit 363 is used to send a channel number to the line group. The line group then inserts a parity error in the data associated with that channel. The data is then routed through the TSI to the terminating line group. This line group senses the parity error and sends the parity error back to the signal processor, which in turn, sends a message to the system controller that a parity error was detected on a certain channel. This action verified that a path is set up in the TSI. Further details of the path test are described in the above-identified application entitled "Path Test Scheme".

The Power Clear Circuit 395 generates a PWR CLR signal to reset all circuits in the Signal Processor to a known state. The Power Clear Circuit 395 is initiated by an NBL signal from SC Interface 302 of FIG. 10B. The UART oscillator 394 includes a 5 MHz crystal oscillator and divides to generate a 500 KHz and 62.5 KHz signal used by Interface 302 of FIG. 10B.

In FIG. 9, the Framing Error /Parity Error Receiver 304 interfaces to the parity error, framing error, and B2=0 error leads coming from the line group via bus 73. When the Receiver 304 detects 3 parity errors, it sends a message to the SC indicating on which channel number these errors were detected. If the receiver detects 7 consecutive framing or B2=0 errors, a message indicating which VB3 is in an alarm condition is sent to the system controller.

The Dial Pulse Register/Sender 303 comprises 2 sections, a Dial Pulse register and a Dial Pulse sender.

The Register 305 detects off-hooks, on-hooks, and dialed digits on any one of the 384 channels in a line group. This is accomplished by digitally timing changes of state of the incoming signaling bits. When these changes meet certain time requirements, they are interpreted as status changes of dialed digits. Messages are sent to the SC containing the status change or the digit received and the channel number.

The Sender 306 is capable of sending off-hook, on-hook, and dialed digits on any one of the 384 channels by manipulating the signaling bits sent to the line group. The signal processor receives a message from the system controller containing the status or digit to be output, and the channel number.

A block diagram of the SC interface 302 is shown in FIG. 10B. Interface 302 includes conventional universal asynchronous receiver/transmitter (UART), including receiver 391 and transmitter 392.

Inputs to receiver 391 are signals F1, F2, phase 1 ($\phi$1), 500 KHz, 62.5 KHz, and DP1-DP256 from the SC control 301 of FIG. 10. Receiver 391 receives a three byte message from the system controller 50 of FIG. 1 via bus 74-1. Outputs of receiver 391 and 1 byte message on bus 74-2 to the system controller. The signal STAT REQ is a status request signal to the dial pulse register/sender. The 6 ms and 24 ms signals are used by the dial pulse register as will be described subsequently. The PT LOAD signal is utilized by the path test 363 of FIG. 10A. The signals GRP1 and GRP2 are utilized to selectively enable one of four possible dial pulse register/senders and parity error/framing error receivers.

The transmitter 392 uses the same inputs as receiver 391, with the exception of F1, F2 signals. In addition, ransmitter 391 has a one byte signal from the system controller via bus 74-3, which corresponds to the bus 74 of FIG. 1. The transmitter 392 has DR CLK signal from control 301 of FIG. 10A and DUMP REQ from appropriate subsystems as will be described. Output of transmitter 392 is a 3 byte message on bus 74-4 to System Controller 50 of FIG. 1. A DUMP EN signal is used by the Parity Error/Framing Error Receiver. PECLR and FECLR signals are applied to the parity error receiver 378 and framing error receiver 371 of FIG. 9, respectively. The NBL signal provides an appropriate initiating signal for the power clear circuit 395.

Data to be loaded into transmitter 392 comes on bidirectional Data 1 – Data 5 lines from the dial pulse register/sender or the parity error/framing error receiver. Data is transmitter out from receiver 391 to the register/sender and parity error/framing error receiver via the Data 1 – Data 5 lines. The Data 1 – Data 5 lines correspond to the 5 bit coded commands as seen in the Chart I.

There is one Dial Pulse Register/Sender 303 per line group or a total of 4 Register/Senders for a full IMA system containing 4 line groups.

In FIGS. 11 and 12, a normal cycle for a channel is as follows. The memory 384 is addressed by the channel address A, and the data appearing at the memory outputs is stored in data latches 385. This data is fed through some logic 386, it is modified or updated according to the condition of the signaling bit. This updated data is then stored in the same memory location it was read from. The next location in memory is then addressed, and the process is repeated.

The address inputs go sequentially from channel $\phi$ to 384, and each memory location is addressed and updated in sequence.

A typical representation of the Dial Pulse Register/Sender is shown in FIG. 11. The waveforms for the signals in FIG. 11 are shown in FIG. 12. The address inputs A select a location in the memory 384. After a short delay, the data stored in that location becomes stable on the memory outputs. The DPRS signal now goes high, and the rising edge clocks the latch 385, through gates 388, 389, transferring the data on the memory output D to the latch outputs E. Simultaneously, the memory write input F goes low for the duration of the DRPS high time.

The signaling bit C now being received is used to modify or update the data stored in the latch 385, and at the same time, the output signaling bit G from the sender is output. If a state change or a dialed digit had been detected at this time, the DUMP REQ outut H goes low. If the SC Interface is idle, it responds with the DUMP EN signal J, which is used to reset the DUMP REQ bit as it is written back in memory 384. After a short delay, DPRS goes low, ending the write pulse for the memory. The address input A then advances to the next channel number.

The predescribed action repeats for each of the 385 channel times. Two of these channels are nonexistent, leaving 384 actual channels. Each channel is addressed two times every 1.5ms. The memory write input of the dial pulse Register is activated only during the first time when the A signaling bits are received and sent. The memory write input of the dial pulse Sender is only activated during the second time, when the B signaling bits are received and sent.

Now that a typical memory cycle has been described, future discussions will be limited to a typical channel, omitting references to memory and memory output latches except where necessary.

The operation of the Dial Pulse Register/Sender will now be described with respect to a single channel, keeping in mind that the description will apply to all of the channels in the Register/Sender.

Referring to FIG. 13, the Dial Pulse Register 305 of FIG. 9 is shown in more detail with an A signal bit AIN input. The A signal bit occurs in the 8th bit of the 6th frame of a 12 frame format. The AIN is from Signaling Bit Buffer 383 of FIG. 22 via bus 368-1. Buffer 383 will be described subsequently. The Dial Pulse Register 305 includes a Memory 308. The Memory 308 is a 386 × 16 RAM. The 16 bits are associated with each of the 384 channels. The inputs of the RAMs originate from the logic sections of the Integrator 309, Timer 310 and Pulse Counter 311 and they are also connected to parity generators (not shown). The parity of the data is checked to ascertain all memory locations are operational. Memory 308 is addressed by signals DP1 –DP256 and DPRS from Control 301 of FIG. 10A.

The purpose of the Integrator 309 is to filter out all noise or short glitches of less than 10 ms on the A signaling input. This will eliminate contact bounce.

Referring to FIG. 15, the digital integrator is shown in further detail. The A signaling bit input on bus 368-1 from Signaling Bit Buffer 383 of FIG. 9 is input to AND gate 402. The A signaling bit is also input to inverter 406 which is connected to AND gate 403. Gates 402, 403 are connected to adder/substractor 401, a conventional 3 bit adder/substractor having 8 unique states. The 3 bits RA1, RA2, RA4, and RA are input to the Integrator from memory 308 via Bus 314 into 4 bit latch 404.

Bits RA1, RA2, RA4, are connected to NAND gate 407 and OR gate 408. Gates 407 and 408 outpus are $\overline{7}$ and $\overline{0}$, and are connected to AND gates 402, 403, respectively. In addition, gate 407 is connected to NAND gates 409 and 410. Gate 408 is connected to NAND gate 409, which in turn is connected to gate 410.

The output of gate 410 forms the fourth bit RAM for input of memoru 308 of FIG. 13 via bus 315. In a addition, NAND gate 410 is connected as an input to the exclusive OR gate 412.

The fourth bit RA of latch 404 is connected to gate 409, exclusive OR gate 412, and as an input to the digital timer. The output of exclusive OR gate 412 is RESET TIME and is input to the timer via bus 316.

The operation of the Integrator will be described in conjunction with FIGS. 13, 15, and 23. The INTEGRATOR 309 uses 4 of the 16 memory bits. Three of the bits are input to a binary adder/ substractor 301 with 8 unique states which, with the shown logic circuitry, will add or subtractor in response to the change of state of the signaling bit. The 4th bit is the integrated A signaling bit. Whenever the A signaling bit input is low, the adder/subtractor counts to 0 and remains there. If the A signaling bit is high, the adder increments to 7 and remains there. Every time the adder/ subtractor transitions from 1 to 0, or from 6 to 7, the integrated A bit is made the same as the A signaling bit.

Every time the integrated A bit from memory is different from integrated A bit to memory, indicating a change, a signal is sent to the digital timer. This signal is used to reset the timer.

Referring to FIG. 15, the 3 counter bits coming out of memory on 4-bit bus 314 are labeled RA1, RA2, and RA4, and labeled RA1M, RA2M, and RA4M when they go back into the memory on 4-bit bus 315. The integrated A bit is called RA coming out of memory and RAM going into memory. In FIG. 23, RA"X" indicates the binary value of the RA1M, RA2M and RA4M bits. Similarly, RA"X"M indicates the binary value of the RA1M, RA2M and RA4M bits.

Referring to FIG. 23, assume that the A signaling bit AIN is low, and the INTEGRATOR 309 is at 0 (as indicated by RA"X"). When the channel is sampled and the A signaling bit goes high, the Integrator 309 adds one to the value of the RA1, RA2, and RA4 outputs on Bus 314, and forwards the new sum via the RA1M, RA2M, and RA4M inputs on Bus 315 to memory 308 for that particular time slot and the new sum is written into memory. This is indicated in FIG. 23 by the RA"X"M change in count from 0 to 1.

1.5 milliseconds later, when this channel time reappears (12 frames × 125 us/frame), a one is read from MEMORY 308 on Bus 314 to Integrator 309. If the A signaling bit is still high, the Integrator 309 will count to 2 and that 2 would be stored in MEMORY 308. If the signaling bit has gone low, 1 will be subtracted from the RA1, RA2 and RA4 outputs of memory 308.

If the signaling bit AIN input continues to remain high, the INTEGRATOR 309 will increment until a count of 6 is reached. When this 6 is read from MEMORY 308 and presented to the INTEGRATOR, the following action will occur.

With the A input still high, a 7 is written into memory. The 7 output will make the RAM signal (bit 4 on Bus 315) go high. Because RAM is now high, and RA is still low, $\overline{\text{RESET TIME}}$ will go low on Bus 316. 1.5 ms later, signal RA will be read high from memory.

All the integrator bits are now high, and the counter will remain at 7 until the signaling bit goes low again, at which time it will start counting down. Signal RAM (bit 4 on Bus 315) will stay high until the counter reaches a count of 1. At this time, the signal RAM will go low and the $\overline{\text{RESET TIME}}$ will also go low. 1.5 ms later, when the data for this channel time is again read from memory 308, the RA signal will be low, and the integrator is back in the on hook state. The time required for a change in the signaling bit to propagate through the INTEGRATOR 309 is from 9.5 to 11 ms.

Referring to FIG. 23, the A signaling input bit AIN is seen in which is included a contact bounce pulse signal. Contact bounce is the uncontrolled making and breaking of a contact one or more times, and which the INTEGRATOR 309 is designed to filter. The RA"X" signal on Bus 314 will begin counting from 0 as the input signaling bit is detected. The RA"X"M signal on Bus 315 reflects the new values of RA"X" being stored in memory 308. In FIG. 23, the A signaling bit goes low during count 2 for the RA"X" signal, representing the contact bounce. The RA"X"M will count down to 1 and the RA"X" count is read as 1 from memory 1.5 ms later.

The ain signal once again goes high to a continuous state, and the RA"X"M and RA"X" begin counting toward 7. When RA"X"M does reach 7, the RAM signal goes high and the $\overline{\text{RESET TIME}}$ goes low. One count later the RA signal goes high and the RESET TIME again goes high. The signals RA, RAM, and $\overline{\text{RESET TIME}}$ will remain at these states until the A signaling bit goes low.

In FIG. 23, when AIN does go low, the RA"X" and RA"X"M proceed to count to 0, taking into consideration any contact bounce of the input signal. When the RA"X"M counts down to 0 the RAM signal will go low, as will the $\overline{\text{RESET TIME}}$. At the next count, the RA signal will go low and the $\overline{\text{RESET TIME}}$ signal will go high. The RA, RAM, and $\overline{\text{RESET TIME}}$ outputs from the integrator are sent to the digital TIMER 310.

The TIMER 310 is a digital up counter with 16 different states. Each of these states represents a certain unique interval. These timing intervals are as follows:

| State | Add | Timing Interval |
|---|---|---|
| 0 | 6ms | 0 – 6ms |
| 1 | 6ms | 6 – 12ms |
| 2 | 6ms | 12 – 18ms |
| 3 | 6ms | 18 – 24ms |
| 4 | 6ms | 24 – 30ms |
| 5 | 6ms | 30 – 36ms |
| 6 | 6ms | 36 – 42ms |
| 7 | 6ms | 42 – 48ms |
| 8 | 24ms | 48 – 72ms |
| 9 | 24ms | 54 – 96ms |
| 10 | 24ms | 78 – 120ms |
| 11 | 24ms | 102 – 144ms |
| 12 | 24ms | 126 – 168ms |
| 13 | 24ms | 150 – 192ms |
| 14 | 24ms | 174 – 216ms |
| 15 | 24ms | $\geq$ 198ms |

Referring to FIGS. 17 and 18, the digital timer 310 of FIG. 13 is shown in further detail. The reset time signal from Integrator on Bus 316 is input to inverter gate 420 which is further input to AND gates 421. The four outputs from AND gates 421 form T1M, T2M, T4M, and T8M outputs on Bus 319 into a portion of memory 308 of FIG. 13, forming a 384 × 6 bit memory. The output of memory 308 of Bus 318 are bits T1, T2, T4, T8 to latch 422 of FIG. 17. Four bits T1, T2, T4, T8 of latch 422 are input to 4 bit adder 423. Bits T1, T2, T4, T8 are also input to conventional binary to decimal state decoder 424. Four bits from adder 423 are input to gates 421.

Outputs of state decoder 424 are input to additional circuitry as follows. State 5-14 from decoder 424 is input to AND gate 433 in FIG. 18. State 5 from decoder 424 is input to NAND gate 435. State $\overline{15}$ is input to inverter 425 and to NAND gate 428. The state 15 signal from gate 425 is input to NAND gate 434 in FIG. 18.

Two additional inputs into latch 422 are AS and SC signals, respectively. From latch 422, signal AS is input to NAND gate 434, AND gate 433, and inverter 440 of FIG. 18. Signal SC is input to NAND gate 443 and also as a status change flag to the system controller. Bit T8 from latch 422 is input to inverter gate 427. The AS and SC signals are input to Interface 302 of FIG. 10B via Data 1– Data 5 lines.

The signals 24 ms and 6 ms from SC Interface 302 of FIG. 10B are input to NAND gates 428, 429, respectively. These gates are in turn input to NAND gate 430, which forms an add signal for adder 423.

In FIG. 18, the RAM signal from the Integrator is input to AND gates 432 and 433. The pulse counter signal NOT 0 is input and AND gate 432, as is the state 15 signal from decoder 424.

The RA signal from the digital integrator is input to inverter 441, NAND gate 435 and AND gate 432.

The reset status change flag from the system controller interface 302 is input to inverter 444 which inputs to NAND gate 443.

The output of AND gate 432 is a SET NEW DIGIT signal to the digital Pulse Counter. The output of AND gate 433 is an ADD PULSE signal to the digital Pulse Counter. The output of NAND gate 434 is a $\overline{\text{RESET}}$ $\overline{\text{AS}}$ signal which is input to NAND gates 437, 439. The output of NAND gate 435 is a $\overline{\text{SET}}$ $\overline{\text{AS}}$ signal to NAND gates 438, 439. The output of NAND gate 443 is input to gate 439.

The output of gate 438 is the ASM signal to memory 308. The output of gate 439 is the SCM signal to memory 308.

The outputs of gates 440, 441 are input to gates 435, 434, respectively.

The operation of the Timer will be described in conjunction with FIGS. 13, 17, 18 and 24.

Referring to FIG. 24, each time the $\overline{\text{RESET TIME}}$ input from the INTEGRATOR 309 goes low, the TIMER 310 is reset to 0. The Adder 423 of FIG. 17 then starts incrementing every 6 ms until a count of 8 is reached. At this time the adder is incremented every 24 ms until a count of 15 is reached. Whenever the TIMER 310 of FIGS. 17 and 18 is at 15, all incrementing is stopped and the TIMER 310 stays in this state until again reset by the $\overline{\text{RESET TIME}}$ signal. The purpose of this "dual speed" counter is to give high resolution during the short time intervals, and low resolution during the higher states, using a minimum number of memory bits and keeping the decoding of these states simple. Using the RA, RAM and $\overline{\text{RESET TIME}}$ outputs from the INTEGRATOR 309, the TIMER 310 senses changes from on-hook to off-hook, and generates status change messages for the system controller (SC). These outputs are also used to detect dial pulses and interdigital pauses, at which time a new digit message is generated.

The TIMER 310 uses memory outputs T1, T2, T4, T8, AS and SC on 6-Bit Bus 318. The "T" outputs are input to Adder 423, the AS output indicates the state of the input channel, and the SC output is a flag to indicate the changes of the AS bit. The TIMER 310 thus uses 6 bits of the Memory 308 or effectively a 386 × 6 Memory.

Bus 319 contains Memory 308 inputs T1M, T2M, T4M, T8, ASM and SCM.

Referring to FIG. 24, assume that the channel is off hook. An input 6 ms signal is a timing pluse that goes high every 6 ms. The signal starts at the beginning of frame 1, and ends at the beginning of the next frame 1, thus having a duration of 1.5 ms. Input signal 24 ms is a 24 ms timing pulse which coincides with every 4th 6 ms pulse. These time pulses are used to increment for adder 423 of FIG. 17.

Referring to FIG. 24, when a channel is seized, the A signaling bit AIN goes high. Approximately 9.5 to 11 ms later, the $\overline{\text{RESET TIME}}$ goes low because of the propagation time through the INTEGRATOR 309. The $\overline{\text{RESET TIME}}$ signal on Bus 316 sets the memory to 0 which effectively resets the TIMER 310 to 0. 1.5 ms later, this 0 is read from memory and into the TIMER 310 via Bus 318. If the 6 ms input is low at this time, the same 0 is returned to memory on Bus 319 and recirculates until 6 ms goes high. At this time, 1 appears in the TIMER output on Bus 319 and is stored in memory. This 1 recirculates in memory until the next occurrence of 6 ms signal, at which time the Count in TIMER 310 is advanced to 2. The TIMER 310 keeps incrementing in this fashion until a count of 5 is reached. When 5 is read from memory, the TIMER will cause the AS signal to go high, as shown in FIG. 24. The SC signal also goes high. 1.5 ms later the signals return to the timer via memory output AS and SC on Bus 319. Signal AS indicates the channel is now considered to be OFF HOOK, and SC is a flag to remember that a change has occurred on the AS bit until a message has been transferred to the SC INTERFACE.

The TIMER 310 continues advancing until a count of 8. At this stage the 6 ms signal is disabled, which prevents the Timer from being advanced by the 6 ms signal. The TIMER 310 is now incremented every 24 ms by the 24 ms signal.

As soon as a count of 15 is reached, the 24 ms signal is also disabled. The count of 15 continues recirculating through memory until the counter is reset by the $\overline{\text{RESET TIME}}$ time signal, which would be caused by a change in the A signaling bit propagating through the integrator 309 of FIG. 13.

In order to detect a dial pulse, if the A signaling bit goes low, the $\overline{\text{RESET TIME}}$ will be applied to the digital TIMER 310 from the INTEGRATOR 309 shortly thereafter. As in FIG. 24, the TIMER count will be reset to 0. The TIMER 310 then starts counting up as previously described. If the A signaling bit goes high, and the $\overline{\text{RESET TIME}}$ signal it causes occurs after a TIMER count of 5 is reached but before a count of 15, a $\overline{\text{ADD PULSE}}$ signal is sent to the PULSE COUNTER 311 on Bus 321.

In order for the transition to propagate through the integrator, the A signaling bit must be high for a minimum of 9.5 to 11 ms. This time interval meets the minimum make portion requirements, so the break of the next pulse can start at this time. Each pulse detected causes a $\overline{\text{ADD PULSE}}$ signal to be sent to the PULSE COUNTER 311. The maximum time allowed for the make portion of the dial pulse is when the Timer counts to state 14. If state 15 is reached (which is greater than 198 ms in duration), it is interpreted as an interdigital pause and the new digit flag is set via the output signal SET NEW DIGIT on Bus 321. The detection of the dial pulse signal is shown in FIG. 24.

To detect an on hook signal when the channel is released, the A signaling bit goes low and the TIMER 310 is reset. In FIG. 24. when A signaling bit AIN goes low the $\overline{\text{RESET TIME}}$ signal is propagated 9.5 to 11 ms later from the Integrator 309 to the TIMER 310. The timer count is then reset to 0 and will count to state 15 if there are no other $\overline{\text{RESET TIME}}$ signals from the INTEGRATOR. When the count reaches 15, the AS signal will reset to a low state, indicating a change of state to on-hook for that channel.

Referring to FIG. 19, the Pulse Counter 311 of FIG. 13 is shown in more detail. The ADD PULSE signal from the digital timer is input and AND gate 451 which in turn is input to conventional 4-bit adder 452. The output bits P1, P2, P4, P8 of adder 452 are input to AND gates 453 and also form a 4-bit digit to the system controller. The outputs of AND gates 453 are input bits P1M, P2M, P4M, P8M to memory 308 of FIG. 13, forming a 384 × 5 bit memory. Bits P1, P2, P4, P8 from memory 308 are input to latch 457. Four bits P1, P2, LP4, P8 from memory 308 are input to 4-bit latch 457 and to adder 452 via bus 323. Bits P1, P2, and P8 form an input to NAND gate 454 which in turn is a $\overline{11}$ (NOT 11) signal to gate 451.

Bits P1, P2, P4, P8 of latch 457 are also input to AND gate 455, which is a NOT 0 signal to the digital timer and is a flag if the timer reaches a count of 15.

Another output of latch 457 is bit ND which is input to NAND gate 460. Gate 460 also has an input signal $\overline{\text{RESET NEW DIGIT}}$ from the system controller interface 302 of FIG. 10B via inverter 458.

A SET NEW DIGIT flag from the digital timer is input to inverter 459 which in turn is input to NAND gate 461. The output of gate 460 is also input to gate 461. The output of gate 461 is an NDM signal input to memory 308 on Bus 324. The ND bit of latch 457 is also a NEW DIGIT flag to system controller via interface 302 of FIG. 10B.

Referring now to the PULSE COUNTER 311 of FIGS. 13, 19 and 25, the PULSE COUNTER 311 accumulates all the pulses detected by the TIMER 310 and forms them into a digit to be forwarded to the system controller (SC). The memory associated with Pulse Counter 311 is a 384 by 5 RAM including outputs P1, P2, P4, P8 and ND (new digit) on Bus 323. P1, P2, P4 and P8 form an input to adder 452. ND is the new digit flag. Bus 324 includes P1M, P2M, P4M, P8M, and NDM.

With each $\overline{\text{ADD PULSE}}$ from the TIMER 310, Pulse Counter 311 adds 1 to the binary value of the P1, P2, P4 and P8 inputs and the new total is sent to memory via Bus 324. This incrementing continues until a count of 11 is reached, or the $\overline{\text{SET NEW DIGIT}}$ input goes low. When 11 is read from memory, the $\overline{\text{ADD PULSE}}$ is prevented from going low again until the PULSE COUNTER 311 has been cleared. This prevents roll over of the pulse counter during continuous pulses, and confines all illegitimate states to one code.

The $\overline{\text{SET NEW DIGIT}}$ output from the Timer causes the NDM signal on Bus 324 to go high. 1.5 ms later the ND signal on Bus 323 goes high and the digit received is output to the system controller. The PULSE COUNTER 311 is reset to 0, and is ready to receive the next digit from the TIMER.

Because there can be instances where the NEW DIGIT and STATUS CHANGE FLAGs are both set, STATUS CHANGE is given priority.

In FIG. 25, with an A signaling bit input, the $\overline{\text{RESET TIME}}$ will generate pulses each time there is a change in state of the A signaling bit going high or low. The $\overline{\text{RESET TIME}}$ will set the TIMER count to 0 for each change of state. The count is shown in FIG. 25 as reset from 15 to 5 at the first, third and fifth reset pulses, because as long as the count is in the 5-14 range, it will not be interpreted as a new digit. The TIMER circuit will generate the $\overline{\text{ADD PULSE}}$ if the TIMER counts to state 5 but not to state 15 before AIN goes high. In FIG. 25, 3 $\overline{\text{ADD PULSE}}$s are generated because of the 3 pulses present on the A signaling input wave form. The PULSE COUNTER 311 will count therefore to 3 before the TIMER 310 counts to 15. When the Timer does count to 15, the $\overline{\text{SET NEW DIGIT}}$ generated will cause the ND signal to be sent to the System Controller (SC). The RESET signal from the SC interface 302 will reset the PULSE COUNTER to zero.

Referring now to FIG. 14, the Dial Pulse Sender includes a 386 × 8 memory and output data latch 340. The RAM inputs originate from the SENDER and B integrator and are also connected to a parity generator (not shown), representing the odd parity bit of the 7 input signals. Memory 340 is addressed by DP1-DP256 and DPRS signals from Control 301 of FIG. 10A.

The B integrator 342 ascertains that the B signaling state is stable for 2 cycles before changing the B status bit. This provides a 1.5 to 3 ms delay. The B integrator 342 uses 2 memory bits BI and BS on Bus 345. The memory inputs are BIM and BSM on Bus 346. Sender 341 receives instructions from Interface 302 via Data 1 – Data 4 and the load signal, which correspond to the Data 1 – Data 5 lines of FIG. 10B. The dial pulse sender 341 of FIG. 14 is shown in more detail in FIGS. 20 and 21.

Referring to FIG. 20, the signal F2 from frame detector of FIG. 10 is input to selector 502, a dual four to one selector. The output of selector is SIGNALING BIT OUT to signaling bit buffer 383 of FIG. 22.

Inputs to latch 501 from Memory 340 of FIG. 14 are bits SA, SB, $\overline{\text{SC}}$, $\overline{\text{SD}}$, SE.

Latch 501 is a 5-bit latch which has outputs as follows. Bits SA, SB, SC, SD are input to adder 503. Bits SA, SB are input to selector 502. Bits SC, SD are input to NAND gate 505 which is connected to selector 502 as a $\overline{\text{SEND PULSE}}$ signal and input to gates 507, 508.

Bits $\overline{\text{SA}}$, $\overline{\text{SB}}$, $\overline{\text{SC}}$, $\overline{\text{SD}}$ are input to NAND gate 504 from latch 501. Gate 504 is input as a $\overline{0}$ (NOT 0) to NAND gates 507, 508 and as a SENDER AT 0 to inverter 532 of FIG. 21.

Bit $\overline{\text{SE}}$ of latch 501 is input to selector 502 and gate 508. Bit SE of latch 501 is input to gate 507 and gate 509.

The output of gate 505 is input to selector 502, and gates 507, 508 as $\geq \overline{12}$ signal.

The signal SP from FIG. 10 is input to gate 508. The signal EP from FIG. 10 is input to gate 507 and to inverter 511 and gate 509 as $\overline{\text{EP}}$.

The output of gates 508 ($\overline{\text{SET SE}}$) and 509 (RESET SE) are input to NAND gate 510, which has an output SEM to memory 340 of FIG. 14.

The output of gate 507 is input $\overline{\text{SUB}}$ to adder 503.

The outputs of adder 503 are bits A, B, C, D to gates 527, 528, 529, 530, respectively of FIG. 21.

Also input to gates 527–530 is output of gate 532, which is the signal SET TO 15.

Referring to FIG. 21, the signals LOAD and DATA 1–DATA 4 from the system controller interface of FIG. 9 are input to quad 2 to 1 converter 526, along with outputs from gates 527–530.

Two bits from converter 526 are bits SAM and SBM to memory 340 of FIG. 14. The other two bits are SCM and SCM which are inverted by gates 533, 534 and become bits $\overline{\text{SCM}}$ and $\overline{\text{SDM}}$ to memory 340.

Referring to FIG. 16, the B integrator of the dial pulse sender is shown in more detail with the B signaling B IN input to inverter 513, NAND gate 517 and is also the input B1M to memory. Bits BI and BS from memory 340 of FIG. 14 form inputs to latch 512. Output of latch 512 are bits BI which is input to NAND gate 514. Bit BI is input to gate 517 which forms an input to gate 518. Bit BS is input to gate 515 and also forms the B STATUS bit.

Output of gate 513 is $\overline{BIN}$ which is input to gate 514. The output of gate 514 is input to gate 515. Gate 515 is input to gate 518 which forms output BSM to memory.

The operation of the Dial Pulse Sender will be described in conjunction with FIGS. 14, 16, 20, 21 and 26.

Assume the B signaling bit is low. As soon as the B signaling bit goes high on Bus 368-2, BIM goes high into memory on Bus 346. 1.5 ms later, BI is read from memory on Bus 345. If the B signaling bit is now low, BIM is reset to memory on Bus 346 and the circuit is back to normal. If the B signaling bit is still high, BSM goes high. 1.5 ms later BS is high from memory on Bus 345 and is sent over to the SC as a signaling bit status change.

The SENDER 341 seizes or releases channels, dials digits on these channels under the control of the SC. The sender used 5 memory bits, SA, SB, SC, SD, and SE on 5-bit Bus 351, and SAM, SBM, SCM, SDM, and SEM on Bus 352.

Whenever the system wants to change the state of the outgoing signaling bits, or dial a digit, a message is sent to the signal processor. As soon as the address counter in the SP control of FIG. 9 reaches the channel number received, a Load signal is applied to selector 526 of FIG. 21. This Load signal selects the A inputs of selector 526, and the Data 1–Data 4 signal received from the system controller interface 302 of FIG. 10B is stored in the memory location for that particular channel via leads SAM, SBM, SCM, and SDM. Outputs SCM and SDM are inverted by gates 533, 534 for the sender's initialization purposes.

If the system controller wants to send out low A and B signaling bits, it will send a "12" to selector 526 via lines Data 1–Data 4 of FIG. 10B. If a high A bit and low B bit are to be sent out, a "13" is sent to selector 526. For a low A bit and high B bit, a "14" is sent to selector 526. For a high bit for both A and B signal bits, a "15" is sent to selector 526.

If the message received was to change the A and B signaling bits, bits SC and SD are both high, which causes the output of gate 505 to be low. This selects the SA inputs to selector 502 during frames 1 through 5, when the SA bit, which represents the A signaling bit, is sent to the signaling bit buffer. During frames 7 through 11, the B signaling bit is sent to the buffer.

If a digit to be output is loaded, SC and SD will not both be high, so the output of gate 505 will be high. At this time, memory signal SE is low, so that the A and B signaling bits sent by selector 502 will be high.

Inputs SP and EP are dial pulse timing signals originating from the dial pulse generator of FIG. 10A. SP marks the beginning of the dial pulse break period and EP marks the end. They both are high for 12 frames, starting at frame 1 and ending at the next frame 1. SP occurs every 100 ms and EP occurs from 55 to 65.5 ms after SP.

The digit received from the system controller which circulates in memory until the first occurrence of signal SP. At this time, gate 505 output of FIG. 20 is high. Gate 504 output is high to indicate that the sender is not at 0. When SP goes high, the output of gate 508 goes low, causing SEM to go high through gate 510. Whenever this channel is now addressed, the A and B signaling bits sent out are low, caused by SE being high.

At the next occurrence of signal EP, the output of gate 507 goes low and the digit appearing at latch 501 is decremented by 1 through 4 bit adder 503. This new digit is stored into memory. Simultaneously, SEM is reset through gates 511, 509 and 510. The signaling bits that are sent out are now high, and 1 pulse has been sent.

The sending of pulses will continue until the output of gate 504 goes low, indicating that all pulses have been sent. This causes the output of gates 527–530 to go high through inverter 532 and resets the sender. The high level of input SA will be sent as the A signaling bit and SB as the B signaling bit until the next message from the system controller for this channel.

Referring to FIG. 26, it can be seen that the sender has received on data lines Data 1–Data 4 a "13", which indicates that a high A bit and low B bit are to be sent out.

Subsequently, the sender receives a "5", which indicates that five pulses are to be sent, representing the digit "5".

Referring to FIG. 22, the Signaling Bit Buffer 383 in the parity/framing error receiver synchronizes the transfer of signaling bits between the Line Group and the Dial Pulse Register/Sender. Random access memories in the Buffer 383 are addressed during channels 0–385 by an address counter in the SP Control on DP1–DP256. Each channel time is divided into two sections, memory read while signal DPRS from SP Control is low, and memory write, while DPRS is high. During the rear cycle the data stored in the location address is sent to the DP Register/Sender via bus 368. During the write cycle, data is written into the address location. As the DPRS goes back low, ending the write pulse, the address inputs advance to the next channel number and that location is accessed. The predescribed action repeats for all channels.

During frames 1–5, bits corresponding to the A signaling and parity bits to be sent to the Line Group are forwarded to the RAMs. Simultaneously, the A signaling bit stored in the RAMs during the previous frame 12 are read from memory and sent to the Dial Pulse Register/ Sender.

During frame 6, the A signaling bits stored into the RAMs during frames 1–5 are read from memory and sent to the Line Group. Simultaneously, B signaling and parity bits are stored in memory.

During frames 7–11, the B bits are read from memory and sent to the Dial Pulse Register/Sender. At the same time, B signaling bits to be sent to the Line Group are stored.

During frame 12, the B signaling bits just stored are output to the line group, while the A signaling bits from the line group are written into memory.

What is claimed is:

1. In a telephone system operating in time frames each consisting of plurality of time slots, said systems connected to a plurality of multitime-slot input and output buses for switching data between time slots on said buses and operating with a multiframe format consisting of a plurality of frames including signaling frames having supervisory signals where the supervisory signals occur as a signaling bit in time slots on said buses during the signaling frames, a dial pulse register/sender comprising:

register means connected to receive said supervisory signals in said time slots on said input buses for detecting a change of state of a supervisory signal during a signaling frame for each of said time slots whereby said register means provides a change of state signal when a supervisory signal for any of said time slots changes from one state to another state for a predetermined period of time, and sender means connected to said output buses for sending a supervisory signal representing said one state or said another state to each of said time slots on said output buses.

2. A system as in claim 1 wherein said register means includes timer means comprising:

memory means for storing a control count between an initial count and a first predetermined count, for each of said time slots, means responsive to the change of state of each supervisory signal for setting the control count to said initial count, timer adder means responsive to the change of state of each supervisory signal for incrementing sequentially said control count from said initial count to not more than said first predetermined count within a predetermined period of time, and means responsive to said control count for producing said change of state signal when said control count reaches a second predetermined count, lower than said first count.

3. A system as in claim 2 further including integrator means comprising:

memory means for storing a second control count, between an initial count and a third predetermined count, for each of said time slots, second timer adder means responsive to a change of state of each supervisory signal including means for incrementing once each signaling frame said second control count from said initial count to not more than said third predetermined count when each of said supervisory signals changes from one state to another state and remains in said another state for a first period of time, means for decrementing once each signaling frame said control count from said third predetermined count to not less than said initial count when one of said supervisory signals changes from said another state to said one state for said first period of time, and logic means, responsive to said control count, for producing a control signal only when each of said supervisory signals changes between said one state and said another state for said first predetermined length of time.

4. A system as in claim 2 wherein said logic means includes means for generating an off-hook signal when said count reaches said second predetermined count.

5. A system as in claim 4 wherein said signaling bit changes from said another state to said one state and wherein said logic means includes means for generating an on-hook signal when said count reaches first predetermined count.

6. A system as in claim 5 wherein said logic means includes means for generating an add pulse signal when said timer adder means increments said control count in response to said first control signal from said initial count and receives another of the control signals before incrementing to said first predetermined count.

7. A system as in claim 6 wherein said logic means includes means for generating a new digit signal when said timer adder means counts to said first predetermined count after said logic means generates one or more add pulse signals.

8. A system as in claim 7 further including pulse counter means comprising memory means for storing from an initial count the number of said add pulse signals for each of said time slots and adder means responsive to said add pulse signals for incrementing from said initial count the number of said add pulse signals thereby representing the digit received.

9. A system as in claim 8 wherein said pulse counter means includes logic means responsive to said new digit signal for transmitting a signal representative of said digit, said system including control means connected to receive the representative signal.

10. A system as in claim 8 wherein said integrator means includes means for detecting a change of state of said each supervisory signal between on hook and off hook.

11. A system as in claim 1 wherein said sender means includes integrator means for detecting the change of state of each of said supervisory signals in alternate signaling frames.

12. A system as in claim 1 wherein said sender means includes memory means for storing one control count for each of said time slots representing the state of a supervisory signal to be sent in specified ones of said time slots, logic means, responsive to said control count for sending a supervisory signal having a state corresponding to said control count to said specified time slots, and control means for specifying said specified time slots.

13. A system as in claim 12 wherein a digit to be sent is represented by changing the state of a signaling bit a number of times corresponding to said digit between said one state and said another state for another predetermined period of time thereby forming a number of pulses corresponding to said digit, wherein said memory means include means for storing another control count representing said digit for each of said time slots, said sender means including logic means, responsive to said another control count, for sending a number of said pulses corresponding to said digit, means for decrementing said another control count each time a pulse is sent until a number of pulses corresponding to said digit have been sent thereby representing said digit, and means for stopping the sending of said pulses when said number of pulses have been sent.

14. A system as in claim 13 wherein the interval between said another state and said one state is break time and where said sender means includes means for adjusting the break time between said supervisory signals for each of said channel time slots.

15. In a telephone system operating in time frames each consisting of a plurality of time slots and operating in a multiframe format consisting of a plurality of frames including signaling frames having supervisory signals where the supervisory signals occur as a signaling bit during each time slot in the signaling frame, a register/sender comprising:

memory means for storing a control count, between an initial count and a predetermined count, for each of said time slots, first adder means responsive to a change of state of said signaling bit including,
  means for incrementing said control count once each signaling frame from said initial count to not more than said predetermined count when said signaling bit changes from one state to another state and remains in said another state for a first period of time,
  means for decrementing said control count once each signaling frame from said predetermined count to not less than said initial count when said signaling bit changes from said another state to said one state for said first period of time,
and logic means, responsive to said control count, for producing a control signal only when said signaling bit changes between said one state and said another state for said first predetermined period of time.

16. A system as in claim 15 further including second memory means for storing another control count between an initial count and a second predetermined count for each of said time slots,
  second adder means responsive to said control signal including,
  means for incrementing from said initial count to not more than said second predetermined count within a predetermined time, and
  logic means responsive to said control count for producing a change of state signal when said control count reaches a third predetermined count, lower than said second predetermined count.

17. A system as in claim 13 wherein said sender means includes selector means for selecting said one control count or said another control count.

18. In a telephone system operating in time frames each consisting of a plurality of time slots, said system connected to a plurality of multitime-slot input and output buses for switching data between time slots on said buses and operating with a multiframe format consisting of a plurality of frames including signaling frames having supervisory signals where the supervisory signals occur as a signaling bit in time slots on said buses during the signaling frames, a dial pulse register/sender comprising:
  register means connected to receive said supervisory signals in said time slots on said input buses for detecting a change of state of a supervisory signal during a signaling frame for each of said time slots, said register means including
  memory means for storing a control count between an initial count and a first predetermined count,
  means responsive to a change of state of said supervisory signal for each of said time slots for setting the control count to said initial count,
  timer adder means for incrementing said control count from said initial count to not more than said first predetermined count within a predetermined period of time, and
  means responsive to said control count for producing a change of state signal when said control count reaches a second predetermined count, lower than said first count,
  said register/sender further comprising sender means connected to said output buses for sending a supervisory signal representing said one state or said another state to each of said time slots on said output buses, said sender means including
  memory means for storing one control count representing the state of a supervisory signal to be sent in specified time slots and for storing another control count representing a digit to be sent in other specified time slots wherein a digit to be sent is represented by changing the state of a signaling bit between said one state and said another state for a predetermined period of time a number of times corresponding to said digit thereby forming a number of pulses corresponding to said digit,
  means responsive to said one control count for connecting a supervisory signal having a state corresponding to said one control count to said specified time slots,
  logic means responsive to said another control count for connecting a number of pulses corresponding to said digit where each pulse is formed by changing the state of said signaling bit between said one state and said another state for said predetermined period of time,
  means for decrementing the control count each time a pulse is sent until a number of pulses corresponding to said digit have been sent thereby representing said digit,
  means for stopping the sending of said pulses when said number of pulses have been sent, and
  control means for specifying said specified time slots.

19. In a telephone system operating in time frames, each consisting of a plurality of time slots, said system connected to a plurality of multitime-slot input and output buses for switching data between time slots on said buses and operating with a multiframe format consisting of a plurality of frames including signaling frames having supervisory signals where the supervisory signals occur as a signaling bit in respective time slots on said buses during the signaling frames, a dial pulse sender comprising:
  memory means for storing one control count for each of said time slots representing one state of a supervisory signal to be sent to specified ones of said time slots,
  logic means, responsive to said control count for each of said time slots, for sending a supervisory signal having a state corresponding to said one control count to each of said time slots, and
  control means for specifying said time slots.

20. A system as in claim 19 wherein a digit to be sent is represented by changing the state of a signaling bit a number of times corresponding to said digit between said one state and another state for another predetermined period of time thereby forming a number of pulses corresponding to said digit, and wherein said sender includes
  memory means for storing another control count representing said digit for each of said time slots,
  logic means, responsive to said another control count, for sending to a sepcified time slot a number of said pulses corresponding to said digit,
  means for decrementing said control count each time a pulse is sent until a number of pulses corresponding to said digit have been sent thereby representing said digit, and
  means for stopping the sending of said pulses when said number of pulses have been sent.

21. A system as in claim 20 wherein said memory means include means for storing a third control count for each of said time slots representing said another state of a supervisory signal to be sent in said specified time slots.

* * * * *

UNITED STATES PATENT AND TRADEMARK OFFICE
CERTIFICATE OF CORRECTION

PATENT NO. : 4,133,980
DATED : January 9, 1979
INVENTOR(S) : Johannes A. R. Moed It is certified that error appears in the above-identified patent and that said Letters Patent are hereby corrected as shown below:

The title of the invention should be --DIAL PULSE REGISTER/SENDER FOR A TDM SWITCHING SYSTEM--.

Signed and Sealed this

Nineteenth Day of June 1979

[SEAL]

Attest:

RUTH C. MASON
Attesting Officer

DONALD W. BANNER
Commissioner of Patents and Trademarks